United States Patent
Rahman et al.

(10) Patent No.: US 10,757,669 B2
(45) Date of Patent: Aug. 25, 2020

(54) WIRELESS DEVICE AND A NETWORK NODE FOR A WIRELESS COMMUNICATION SYSTEM AND METHODS THEREOF

(71) Applicant: Telefonaktiebolaget LM Ericsson (publ), Stockholm (SE)

(72) Inventors: Imadur Rahman, Sollentuna (SE); Christopher Callender, Kinross (GB); Dominique Everaere, Åkersberga (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 15/578,361

(22) PCT Filed: Nov. 3, 2017

(86) PCT No.: PCT/SE2017/051099
§ 371 (c)(1),
(2) Date: Nov. 30, 2017

(87) PCT Pub. No.: WO2018/084797
PCT Pub. Date: May 11, 2018

(65) Prior Publication Data
US 2018/0368093 A1    Dec. 20, 2018

Related U.S. Application Data

(60) Provisional application No. 62/417,448, filed on Nov. 4, 2016.

(51) Int. Cl.
*H04J 3/06*   (2006.01)
*H04W 56/00*   (2009.01)
(Continued)

(52) U.S. Cl.
CPC ......... *H04W 56/0055* (2013.01); *H04L 5/001* (2013.01); *H04L 5/0035* (2013.01); *H04L 5/0098* (2013.01); *H04W 72/12* (2013.01)

(58) Field of Classification Search
CPC .. H04W 56/0055; H04W 72/12; H04L 5/001; H04L 5/0035; H04L 5/0098
(Continued)

(56) References Cited

U.S. PATENT DOCUMENTS

2015/0148050 A1* 5/2015 Siomina ................. H04J 11/005
                                                                    455/452.1
2015/0304875 A1* 10/2015 Axmon ................. H04W 24/10
                                                                    370/328
(Continued)

FOREIGN PATENT DOCUMENTS

WO    2016 080899 A1    5/2016

OTHER PUBLICATIONS

PCT Written Opinion of the International Searching Authority for International application No. PCT/SE2017/051099—dated Jan. 31, 2018.
(Continued)

*Primary Examiner* — Thai D Hoang
(74) *Attorney, Agent, or Firm* — Baker Botts, LLP

(57) ABSTRACT

The disclosure relates to a method and wireless device configured for communication in a wireless communication network, the method comprising the steps of obtaining a first transmission time interval, TTI, used for transmission timing of a first signal, obtaining a second TTI, used for transmission timing of a second signal, obtaining a maximum received time difference, MRTD, parameter, and operating the first signal between a wireless device and a first cell using the MRTD parameter and a first carrier, and the second signal between the wireless device and a second cell using
(Continued)

the MRTD parameter and a second carrier, the second carrier being different from the first carrier, wherein the MRTD parameter is obtained by determining the MRTD parameter based on the first and the second TTI. The disclosure further relates to a network node and a method thereof.

25 Claims, 13 Drawing Sheets

(51) Int. Cl.
*H04L 5/00* (2006.01)
*H04W 72/12* (2009.01)

(58) Field of Classification Search
USPC .................. 370/252, 350, 503, 508–510; 375/355–356, 362–364
See application file for complete search history.

(56) References Cited

U.S. PATENT DOCUMENTS

| | | |
|---|---|---|
| 2016/0029330 A1 | 1/2016 | Siomina et al. |
| 2016/0227505 A1 | 8/2016 | Loehr et al. |
| 2016/0249329 A1 | 8/2016 | Au et al. |
| 2017/0288845 A1* | 10/2017 | Axmon ..................... H04L 5/16 |
| 2017/0366313 A1* | 12/2017 | Rahman .............. H04W 56/001 |
| 2018/0132245 A1* | 5/2018 | Yerramalli .......... H04W 52/221 |
| 2018/0249399 A1* | 8/2018 | Takeda .................. H04W 48/10 |
| 2018/0368093 A1* | 12/2018 | Rahman ............ H04W 56/0055 |
| 2019/0132837 A1* | 5/2019 | Yi .............................. H04L 5/00 |
| 2019/0191429 A1* | 6/2019 | Stern-Berkowitz .......................... H04W 72/048 |

OTHER PUBLICATIONS

PCT Notification of Transmittal of the International Search Report and the Written Opinion of the International Searching Authority, or the Declaration for International application No. PCT/SE2017/051099—dated Jan. 31, 2018.
PCT International Search Report for International application No. PCT/SE2017/051099—dated Jan. 31, 2018.
3GPP TSG-RAN WG4 Meeting #81; Reno, USA; Source; Ericsson; Title: Initial views on RRM requirements impacted by shortened TTI and processing time reduction (R4-1609558)—Nov. 14-18, 2016.

* cited by examiner

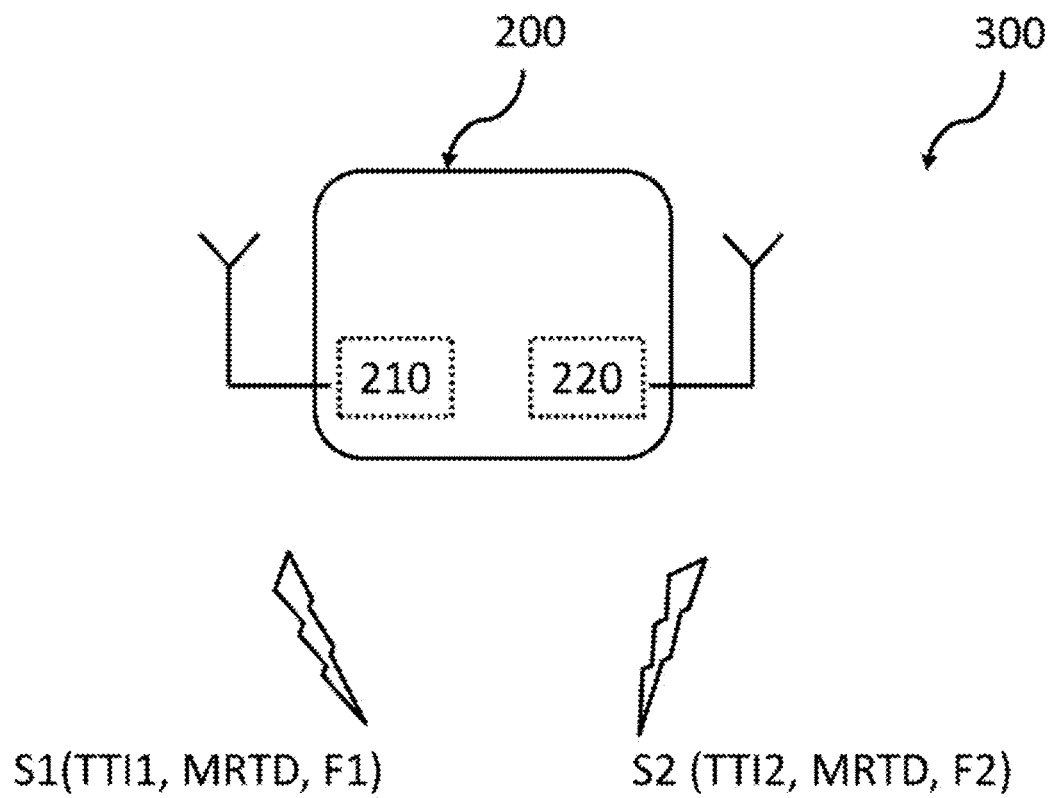
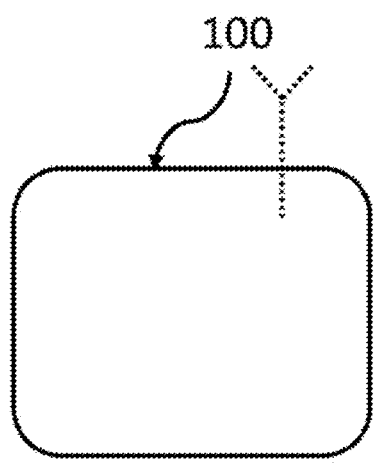
Fig. 2

| Cases | Carrier combinations | Example (with two carriers, however not limited to two carriers) |
|---|---|---|
| Same TTI pattern is used in different carriers | More than one carriers in the aggregation | A cell Cell1 operating in frequency F1 uses a $1^{st}$ TTI pattern, while a cell Cell2 operating in frequency F2 uses the same TTI pattern. A UE aggregates Cell1 and Cell2 in one CA configuration. |
| Different TTI patterns are used in different carriers | More than one carriers in the aggregation | A cell Cell1 operating in frequency F1 uses a $1^{st}$ TTI pattern, while a cell Cell2 operating in frequency F2 uses a $2^{nd}$ TTI pattern. A UE aggregates Cell1 and Cell2 in one CA configuration. |
| Different TTI patterns are used in UL and DL of any carrier | More than one carriers in the aggregation | A cell Cell1 operating in frequency F1 uses a $1^{st}$ TTI pattern in UL, while it uses a $2^{nd}$ TTI pattern in DL. Another cell Cell2 operating in frequency F2 uses the $1^{st}$ TTI pattern in UL while uses the $2^{nd}$ TTI pattern in DL. A UE aggregates Cell1 and Cell2 in one CA configuration. |
| | | A cell Cell1 operating in frequency F1 uses a $1^{st}$ TTI pattern in UL, while it uses a $2^{nd}$ TTI pattern in DL. Another cell Cell2 operating in frequency F2 uses a $3^{rd}$ TTI pattern in both UL and DL. A UE aggregates Cell1 and Cell2 in one CA configuration. |

Fig. 11

| TTI length | TTI duration | MRTD |
|---|---|---|
| 14OS | 1ms | (30+0.26)μs |
| 7OS | 0.5ms | (15+0.26)μs |
| 4OS | 285.71μs | (60/7+0.26)μs |
| 2OS | 142.86μs | (30/7+0.26)μs |

Table 1

| TTI length | TTI duration | MRTD |
|---|---|---|
| 14OS | 1ms | (30+0.26)μs |
| 7OS | 0.5ms | (25+0.26)μs |
| 4OS | 285.71μs | (20+0.26)μs |
| 2OS | 142.86μs | (10+0.26)μs |

Table 2

| TTI length | TTI duration | MRTD |
|---|---|---|
| 14OS | 1ms | K1*(30+0.26)μs |
| 7OS | 0.5ms | K2*(30+0.26)μs |
| 4OS | 285.71μs | K3*(30+0.26)μs |
| 2OS | 142.86μs | K4*(30+0.26)μs |

Table 3

| TTI length | TTI duration | MRTD |
|---|---|---|
| 14OS | 1ms | L1* μs |
| 7OS | 0.5ms | L2* μs |
| 4OS | 285.71μs | L3* μs |
| 2OS | 142.86μs | L4* μs |

Table 4

| TTI group | TTI length | TTI duration | MRTD |
|---|---|---|---|
| 1 | 14OS | 1ms | (30+0.26)μs |
| | 7OS | 0.5ms | (30+0.26)μs |
| 2 | 4OS | 285.71μs | (15+0.26)μs |
| | 2OS | 142.86μs | (15+0.26)μs |

Table 5

| TTI length | TTI duration | MRTD (μs) | |
|---|---|---|---|
| | | Synchronous DC | Asynchronous DC |
| 14OS | 1ms | 33 | 500 |
| 7OS | 0.5ms | 23 | 250 |
| 4OS | 285.71μs | 18 | 64.355 |
| 2OS | 142.86μs | 13 | 500/7 |

Table 6

Fig. 12

| TTI length (Symbols) | | ΔTr (μs) |
|---|---|---|
| PCell | SCell | |
| 14 | 14 | 30.26 |
| 2 | 2 | 10.26 |
| 14 | 2 | 10.26 |
| 2 | 14 | 10.26 |

Table 7.9.2-1

| TTI length (Symbols) | | | | | ΔTr (μs) |
|---|---|---|---|---|---|
| PCell | SCell1 | SCell2 | SCell3 | SCell4 | |
| 14 | 14 | 14 | 14 | 14 | 30.26 |
| 2 | 2 | 2 | 2 | 2 | 10.26 |

Table 7.9.2-2

| TTI length (Symbols) | | ΔTs (μs) |
|---|---|---|
| PCell | PSCell | |
| 14 | 14 | 33 |
| 2 | 2 | 13 |
| 14 | 2 | 13 |
| 2 | 14 | 13 |

Table 7.15.2-1

| TTI length (Symbols) | | ΔTa (μs) |
|---|---|---|
| PCell | PSCell | |
| 14 | 14 | 500 |
| 2 | 2 | 500/7 |
| 14 | 2 | 500/7 |
| 2 | 14 | 500/7 |

Table 7.15.2-2

Fig. 13

WIRELESS DEVICE AND A NETWORK NODE FOR A WIRELESS COMMUNICATION SYSTEM AND METHODS THEREOF

PRIORITY

This nonprovisional application is a U.S. National Stage Filing under 35 U.S.C. § 371 of International Patent Application Serial No. PCT/SE2017/051099 filed Nov. 3, 2017, and entitled "Wireless Device And A Network Node For A Wireless Communication System And Methods Thereof" which claims priority to U.S. Provisional Patent Application No. 62/417,448 filed Nov. 4, 2016, both of which are hereby incorporated by reference in their entirety.

TECHNICAL FIELD

The present disclosure relates to a wireless device for a wireless communication system. Furthermore, the present disclosure also relates to a corresponding, method, computer program and computer program product.

BACKGROUND

In wireless communication networks, such as LTE or LTE advanced, transmissions may be organized into radio frames, e.g. comprising equally-sized sub-frames. Resource allocation, e.g. in LTE, may described in terms of resource blocks (RB), where a resource block may corresponds to one slot in the time domain and a number of subcarriers in the frequency domain. A pair of two resource blocks, adjacent in time, may be referred to as a resource block pair, also denoted as Transmission Time Index or Transmission Time Interval, TTI.

Packet data latency is one of the performance metrics that vendors, operators and also end-users (via speed test applications) regularly measures. Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One problem with conventional wireless communication networks is the required transport time of data and control signaling, e.g. due to the duration of a TTI.

A further problem with conventional wireless communication networks is when a wireless device is served by one or more cells or carriers involved in Carrier Aggregation, CA, or dual connectivity, DC, is that an unnecessary large timing misalignment margin is used. This leads to increased latency. The timing misalignment margin may be represented by a maximum received time difference, MRTD, parameter. The timing misalignment margin is intended to compensate for relative propagation delay, e.g. the difference of propagation delay between the MeNB and the SeNB, transmission timing difference due to synchronization levels between antenna connectors of the MeNB and the SeNB, and delay due to multipath propagation of radio signals. In other words, the MRTD specifies the maximum timing misalignment between the two signals that the UE shall be or is able to receive when operating in CA/DC, and that may be a result of difference of propagation delay between the MeNB and the SeNB, transmission timing difference, e.g. due to synchronization levels between antenna connectors of the MeNB and the SeNB, and delay due to multipath propagation of radio signals.

Yet a further problem with conventional wireless communication networks is that the specified maximum receive timing difference is suitable for longer TTI duration.

Yet a further problem with conventional wireless communication networks is that they do not support the scenario when different TTI durations or timing misalignment margin is used in different cells or carriers involved in a CA (or DC) operation.

Thus there is a need to provide a solution which mitigates or solves the drawbacks and problems of conventional solutions.

SUMMARY

An objective of embodiments of the invention is to provide a solution which mitigates or solves the drawbacks and problems of conventional solutions. The above and further objectives are achieved by the subject matter of the independent claims. Further advantageous implementation forms of the invention are defined by the dependent claims.

According to a first aspect the above objectives are achieved by a wireless device and a method thereof for communication in a wireless communication network, the method comprising the steps of obtaining a first transmission time interval, TTI, used for transmission timing, of a first signal, obtaining a second TTI used for transmission timing of a second signal, obtaining a maximum received time difference, MRTD, parameter, and operating the first signal between a wireless device and a first cell using the MRTD parameter and a first carrier, and the second signal between the wireless device and a second cell using the MRTD parameter and a second carrier, the second carrier being different from the first carrier, wherein the MRTD parameter is obtained by determining the MRTD parameter based on the first and the second TTI.

The following advantages are obtained using this invention:

The UE behavior with respect to maximum receive timing window is well defined for different TTI pattern The UE behavior with respect to maximum receive timing window is well defined when different TTI patterns are used in UL and DL. The UE behavior with respect to maximum receive timing window is well defined when different TTI patterns are used in different carriers in CA (or DC) operation. Further advantages are reducing the mismatch in terms of allocated power by scaling the MRTD with the TTI duration.

The above objectives are solved by the subject matter of the independent claims. Further advantageous implementation forms of the present invention can be found in the dependent claims.

Further applications and advantages of embodiments of the invention will be apparent from the following detailed description. The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The appended drawings are intended to clarify and explain different embodiments of the invention, in which:

FIG. 2 shows a wireless communication system according to an embodiment of the present disclosure.

FIG. 11 shows different scenarios involving different TTI patterns according to one or more embodiments of the present disclosure.

FIG. 12 shows specific examples of determining the MRTD parameter according to one or more embodiments of the present disclosure.

FIG. 13 shows aspects of 3GPP TS 36.133 v14.1.0.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
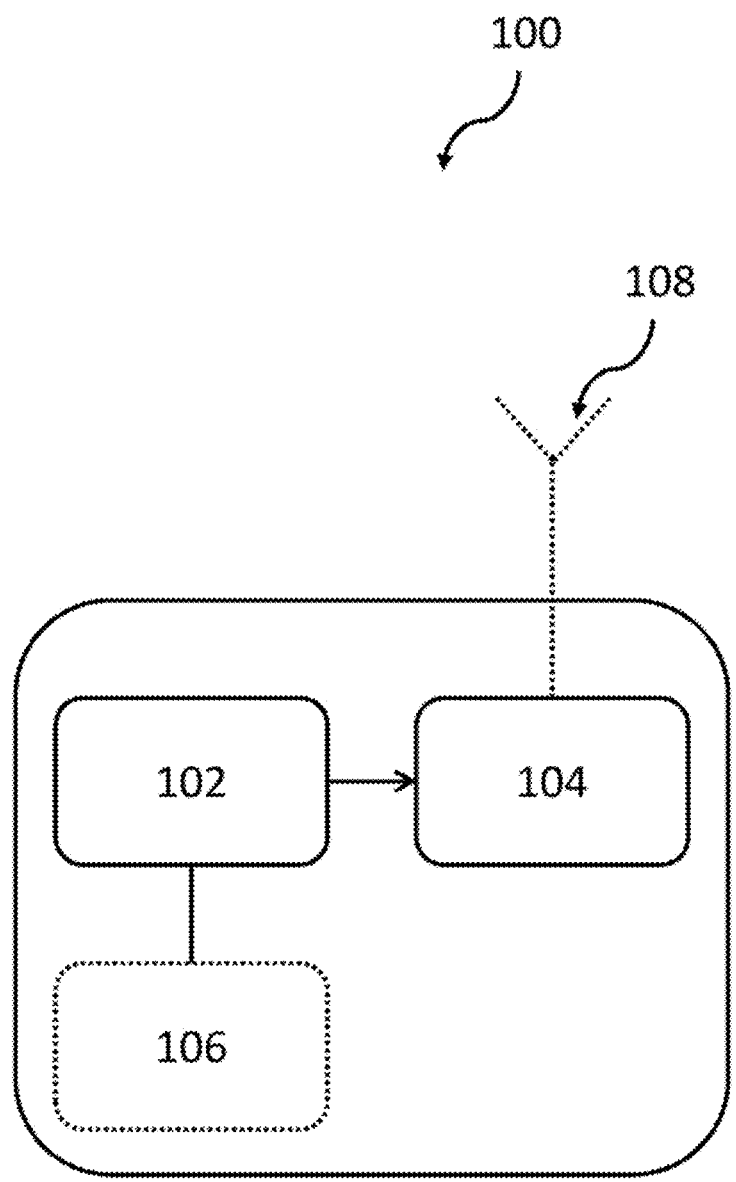
FIG. 1 shows a wireless device according to an embodiment of the present disclosure.

In the following disclosure further embodiments of the disclosure are described in mainly 3GPP context with its terminology. However, embodiments of the disclosure are not limited to 3GPP communication systems, such as LTE and LTE Advanced.

In this invention disclosure, we sometimes use the terms a first node and a second node interchangeably with a wireless device 100 and a network node 200 which are nodes either transmitting or receiving in licensed, unlicensed spectrum or a shared spectrum where more than one system operates based on some kind of sharing regulations. Examples of a network node 200 are NodeB, base station (BS), multi-standard radio (MSR) radio node such as MSR BS, eNodeB, gNodeB, MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc. An example of a wireless device 100 could be a user equipment, this is a non-limiting term user equipment (UE) and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dangles etc. In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In this invention, any of the above mentioned nodes could become the wireless device 100 and/or the network node 200.

A component carrier (CC) may also interchangeably be referred to as carrier, Primary Compound Carrier PCC or Secondary Compound Carrier SCC. The component carrier is configured at the UE by the network node using higher layer signaling e.g. by sending RRC configuration message to the UE. The configured CC is used by the network node for serving the UE on the serving cell (e.g. on PCell, PSCell, SCell etc) of the configured CC. The configured CC is also used by the UE for performing one or more radio measurements (e.g. RSRP, RSRQ etc) on the cells operating on the CC e.g. PCell, SCell or PSCell and neighboring cells.

The term fallback mode refers herein to a CA configuration which contains fewer CCs than the maximum number of CCs in a CA combination supported by the UE. For example a UE supporting a CA combination with a maximum CA configuration of 4 DL CCs and 1 UL CC may support the following 3 fallback modes: 3 DL CCs and 1 UL CC, 1 DL CCs and 1 UL CC and DL CC and 1 UL CC (i.e. single carrier operation). The term fallback mode is also interchangeably called as lower order CA combination, lower order CA configuration, fallback CA mode, fallback CA configuration mode, fallback CA combination etc. The term radio access technology, or RAT, may refer to any RAT e.g. UTRA, E-UTRA, narrow hand internet of things (NB-IoT), WiFi, Bluetooth, next generation RAT (NR), 4G, 5G, etc. Any of the first and the second nodes may be capable of supporting a single or multiple RATs.

A UE may be configured to operate in carrier aggregation (CA) implying aggregation of two or more carriers in at least one of DL and UL directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell etc.) of the configured CC. The configured CC is also used by the UE for performing one or more radio measurements (e.g. RSRP, RSRQ etc.) on the cells operating on the CC e.g. PCell, SCell or PSCell and neighboring cells. The term dual connectivity used herein may refer to the operation mode wherein the UE can be served by at least two nodes called master eNB (MeNB) and secondary eNB (SeNB). More generally in multiple connectivity, multi-connectivity or dual connectivity, DC, operation the UE can be served by two or more nodes e.g. MeNB, SeNB1, SeNB2 and so on.

The UE is configured with PCC from both MeNB and SeNB. The PCell from MeNB and SeNB are called as PCell and PSCell respectively. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures e.g. radio link monitoring (RLM), DRX cycle, etc. on their PCell and PSCell respectively. The above definitions also include dual connectivity (DC) operation, which is performed based on corresponding CA configurations. In this disclosure, all methods that are described for CA operation are equally applicable to DC operation, unless stated otherwise. The term signal used herein can be any physical signal or physical channel. Examples of physical signals are reference signal such as PSS, SSS, CRS, PRS etc. The term physical channel (e.g., in the context of channel reception) used herein is also called as channel. Examples of physical channels are MIB, PBCH, NPBCH, PDCCH, PDSCH, sPUCCH, sPDSCH, sPUCCH. sPUSCH, MPDCCH, NPDCCH, NPDSCH, E-PDCCH, PUSCH, PUCCH, NPUSCH etc. The term time resource used herein may correspond to any type of physical resource or radio resource expressed in terms of length of time. Examples of time resources are: symbol, time slot, sub-frame, radio frame, TTI, interleaving time, etc. The term TTI used herein may correspond to any time period (T0) over which a physical channel can be encoded and optionally interleaved for transmission. The physical channel is decoded by the receiver over the same time period (T0) over which it was encoded. The TTI may also interchangeably called as short TTI (sTTI), transmission time, slot, sub-slot, mini-slot, mini-sub-frame etc. The term radio measurement used herein may comprise any measurement based on receiving a radio signal or channel, e.g., power-based measurements such as received signal strength (e.g., RSRP or CSI-RSRP) or quality measurements (e.g., RSRQ, RS-SINR, SINR, Es/Iot, SNR); cell identification; synchronization signals measurements; angle measurements such as angle of arrival (AOA); timing measurements such as Rx-Tx, RTT, RSTD, TOA, TDOA, timing advance; throughput measurements; channel quality measurements such CSI, CQI, PMI, channel measurement (e.g. MIB, SIBs, SI, CGI acquisitions etc.). A measurement may be absolute, relative to a common reference or to another measurement, composite measurement (U.S. 61/678,462 filed on 2012 Aug. 1), etc. A measurement may be on one link or more than one links (e.g., RSTD, timing advance, RTT, relative RSRP; measurements over multifarious links described in PCT/SE2012/050644 filed on 2012 Jun. 13, etc.). Measurements may also be differentiated by purpose and may be performed for one or more purposes, e.g., for one or more of: RRM, MDT, SON, positioning, timing control or timing advance, synchronization. In a non-limited example, the invention may apply to any measurement such as described above. Herein, the term "radio measurement" may be used in a broader sense, e.g., receiving a channel (e.g., receiving system information via broadcast or multicast channel). The term requirements used herein may comprise any type of UE requirements related to UE measurements aka measurement requirements, RRM requirements, mobility requirements, positioning measurement requirements etc. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay etc. The term "first cell" may be used interchangeably with "cell1" herein. The term "second cell" may be used interchangeably with "cell2" herein.

As briefly mentioned in the background section, in conventional systems the specified maximum receive timing difference is suitable for 1 ms TTI duration. Also, the conventional systems do not account the scenario when different TTI duration is used in different carriers involved in a multicarrier operation such as CA (or DC) operation.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

Co-located eNBs/cells form primary use cases of CA. CA operation may involve two or more non-co-located cells or transmitters, even though, one of the main issues related to the wireless device 100 receiver performance is the receive timing difference $\Delta t$ of the first and second signals S1, S2, e.g. signals from the Pcell and the Scell(s) received at the wireless device 100, also referred to as UE, receiver. The UE or wireless device 100 can perform CA operation provided the timing difference $\Delta t$ between the signals received at the UE, e.g. from CCs belonging to the Pcell and Scell(s), are within a certain threshold e.g. ±30.26 μs. In DC the handling of the received timing difference $\Delta t$ of the signals from MeNB and SeNB received at the UE or wireless device 100 depends on UE or wireless device 100 architecture. This gives rise to two cases of dual connectivity, DC, operation with respect to the UE or wireless device 100 synchronization status or level. The first case is synchronized DC operation and the second case is unsynchronized DC operation. The synchronized DC operation and unsynchronized DC operation are also interchangeably called as synchronous and asynchronous DC. The synchronized operation herein means that the UE or wireless device 100 can perform DC operation provided the timing difference $\Delta t$ between the signals received at the UE or wireless device 100 from the CCs belonging to the MCG and SCG are within a certain MRTD threshold, e.g. ±33 μs. As an example, the unsynchronized operation herein means that the UE can perform DC operation regardless of the timing difference $\Delta t$ between the signals received at the UE or wireless device 100 from the CCs belonging to the MCG and SCG. I.e. for any value of $\Delta t$. As an example, the unsynchronized operation herein may comprise the timing difference $\Delta t$ between the signals received at the UE or wireless device 100 from the sub-frame boundaries of the CCs belonging to the MCG and SCG can be any value, e.g. more than ±33 μs, any value up to ±0.5 ms etc. Furthermore, the UE or wireless device 100 is also capable of handling a maximum uplink transmission timing difference between PCell and PSCell of at least 35.21 μs if the UE is capable of synchronous dual connectivity and up to 500 μs if the UE is capable of asynchronous dual connectivity. For dual connectivity operation, the maximum receive timing difference ($\Delta t$) at the UE is mainly due to contributions from:

(1) Relative propagation delay difference between MeNB and SeNB, (2) Tx timing difference due to synchronization levels between antenna connectors of MeNB and SeNB, and (3) Delay due to multipath propagation of radio signals Regarding relative propagation delay difference, the present LTE design allows for a maximum delay difference of 30.26 μs and is designed for worst case where the first and second cells 210, 220 are not-co-located. A delay difference of 30.26 μs corresponds to signal propagation distance of just over 9 km. In dense urban scenarios, maximum receive timing misalignment due to propagation delay that is normally seen is around 10 μs and is substantially linearly related to relative physical distance between the nodes. In other words, the measured timing difference Δt will vary, e.g. as the UE moves away from one of the two eNB NW nodes, and closer to the other, or when the multipath propagation changes possibly as an effect of the UE or other obstacles are moving.

Regarding Transmit timing difference between the MeNB and SeNB, when the first and second cell 210, 220 are configured for synchronized transmission case using CA. This essentially means that the Pcell and the Scell transmit timing needs to be synchronized with a certain level of time accuracy. It is worth noting here that the measured time difference ΔTr that we refer to herein is the timing misalignment at which two signals S1, S2 are received at the wireless device 100, and not the transmit timing mismatch between the Pcell and Scell(s).

Regarding delay due to the multipath radio environment, the received time difference of radio signals S1, S2, e.g. from Pcell and Scell(s), may also incorporate additional delay introduced by the multi-paths due to the characteristics of the radio environment. For example in typical urban environment the delay spread of multiple paths received at the wireless device 100 receiver may typically be in the order of 1-3 μs. However, wide areas like in sub urban or rural deployment scenario, the channel delay spread due to multipath effect of the signals observed at the wireless device 100 receiver is relatively small e.g. less than 1 μs.

The total maximum receive timing difference is the combined delay according to the previously mentioned contributions 1, 2 and 3. The inventors realized that the present design, e.g. of LTE, has a large amount of timing misalignment margin built in to it, which may not be required as the actual distance between nodes is significantly smaller than what was designed for. The inventors further realized that there is a possibility to relax the requirement for the Maximum Receive Timing Difference margin even higher than certain transmit timing misalignment, i.e. synchronization accuracy between MeNB and SeNB in case of dual connectivity E.g. 3 μs. 3 μs is chosen here since co-channel synchronization accuracy requirement for TDD systems is 3 μs, which means that the tightest requirement that can be achieved is 3 μs.

FIG. 1 shows a wireless device 100, 200 according to an embodiment of the disclosure. The wireless device 100, 200 comprises a processor 102 communicatively coupled to one or more transceivers 104. Further, the wireless device 100, 200 may further comprise an optional antenna 108, as shown in FIG. 1. The antenna 108 is coupled to the transceiver 104 and is configured to transmit and/or emit and/or receive a wireless signals S1, S2 in a wireless communication system, e.g. emit transmission data comprised in the wireless signals. In one example, the processor 102 may be any of processing circuitry and/or a central processing unit and/or processor modules and/or multiple processors configured to cooperate with each-other. Further, the wireless device 100, 200 may further comprise a memory 106. The memory 106 may contain instructions executable by the processor to perform the methods described herein. The processor 102 may be communicatively coupled to a selection of the transceiver 104 and the memory 106. In this disclosure a wireless device 100 may refer to a wireless device configured as a user equipment UE, wireless terminal, mobile phone, smart phone or tablet computer. In this disclosure a wireless device 100 may further refer to a wireless device 100 configured as a network node 200, e.g. in the form of a network control node, network access node, an access point or a Radio Base Station (RBS). A Radio Base Station (RBS), which in some networks may be referred to as transmitter, "MeNB", "SeNB", "eNB", "eNodeB", "NodeB" or "B node", depending on the technology and terminology used. The wireless devices may be of different classes such as, e.g., macro eNodeB, home eNodeB or pico base station, based on transmission power and thereby also cell size. The wireless device can be an 802.11 access point or a Station (STA), which is any device that contains an IEEE 802.11-conformant Media Access Control (MAC) and Physical Layer (PHY) interface to the Wireless Medium (WM). The wireless device 100, 200 is however not limited to the above mentioned communication devices. A wireless device 100 configured as a network node 200 may comprise a plurality of transceivers and/or cells with at least one respective antenna coupled to it. Each of the plurality of transceivers and/or cells may be communicatively coupled to the processor 102. The plurality of transceivers and/or cells may be configured for multicarrier operation, such as carrier aggregation, CA, and/or dual connectivity, DC. In CA a first cell may be configured as primary Compound Carrier, PCC, cell or Serving cell which may be referred to as a Primary Cell or PCell. The PCell is particularly important e.g. due to that control signaling is signaled by this cell etc. The served wireless device 100 may perform monitoring of the radio quality on the PCell. A CA capable wireless device 100 can, as explained above, also be configured with additional carriers, cells or serving cells which are referred to as Secondary Cells or SCells. In dual connectivity, DC, a served wireless device 100, e.g. in RRC_CONNECTED state, may be configured with a Master Cell Group (MCG) and a Secondary Cell Group (SCG). Cell Group (CG) is a group of serving cells associated with either the MeNB or the SeNB, respectively. The MCG may be defined as a group of serving cells associated with a MeNB, comprising of the PCell and optionally one or more SCells. A SCG may be defined as a group of serving cells associated with the SeNB comprising a pSCell (Primary SCell) and optionally one or more SCells.

FIG. 2 shows a wireless communication system 300 comprising a served wireless device 100 and a network node 200, wherein the wireless device 100 may be configured to operate one or more wireless signals S1, S2 between the wireless device 100 and a first cell 210 or a second cell 220 comprised in the network node 200. The first signal S1 may be operated, e.g. transmitted or received, between the wireless device 100 and a first cell 210 of the network node 200 based on and/or using a Maximum Receive Timing Difference, MRTD, parameter and resource blocks, RB, comprised in a first carrier F1. The second signal S2 may be operated between the wireless device 100 and a second cell 220 of the network node 200 using the MRTD parameter and RB:s, comprised in a second carrier F2 different from the first carrier F1. Optionally, the first signal S1 may be operated based on and/or using a first transmission time interval TTI1 used for transmission timing of the first signal S1. Optionally, the second signal S2 may be operated based on and/or using a second transmission time interval TTI2 used for transmission timing of the second signal S2, as further described in relation to FIG. 11.

The first cell 210 may be provided by a first network node and the second cell 220 may be provided by a second network node. The two network nodes proving these cells are typically, but not necessarily, at different locations.

The wireless communication system 300 may comprise a plurality of wireless devices 100 and/or network nodes 200. The wireless communication system 300 may be a UMTS, LTE, LTE Advanced, 802.11 family systems or any other wireless system known to a skilled person.

Figure 8:
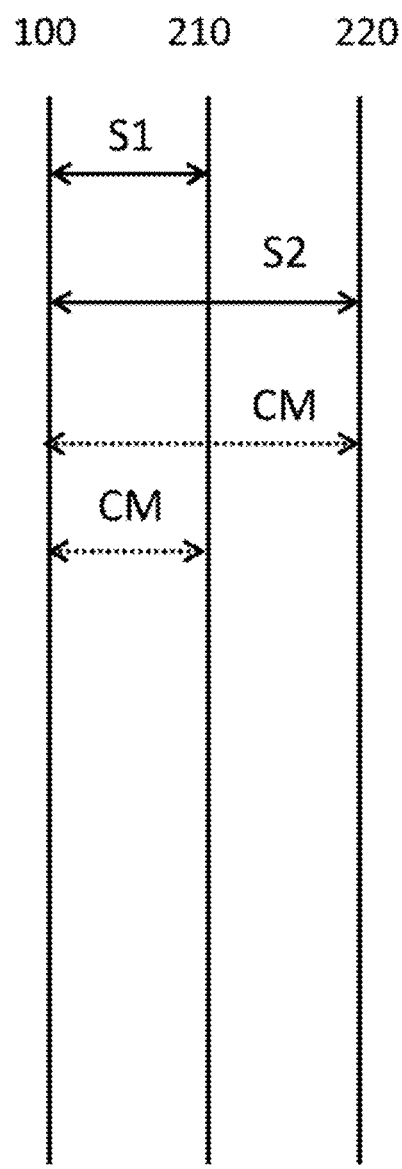
FIG. 8 schematically shows how signals are exchanged between the wireless devices and network nodes according to an embodiment of the present disclosure.

FIG. 8 schematically shows how signals are exchanged between wireless devices and cells in the wireless communication network 300 according to an embodiment of the present disclosure. The diagram shows a first wireless device 100 and a network node 200 supporting the first cell 210 and the second cell 220. The wireless device 100 may operate, e.g. receive or transmit, the first signal S1 from/to the first cell (210) and/or operate, e.g. receive or transmit, the second signal S2 from/to the second cell 210. The first cell (210) may operate, e.g. receive or transmit, the first signal S1 from/to wireless device 100 and/or the second cell 210 may operate, e.g. receive or transmit, the second signal S2 from/to the wireless device 100. The wireless device 100 may operate, e.g. receive or transmit, the configuration message CM from/to the first cell (210) and/or operate, e.g, receive or transmit, the configuration message CM from/to the second cell 210. The first cell (210) may operate, e.g. receive or transmit, the configuration message CM from/to wireless device 100 and/or the second cell 210 may operate, e.g. receive or transmit, the configuration message CM from/to the wireless device 100.

Figure 3:
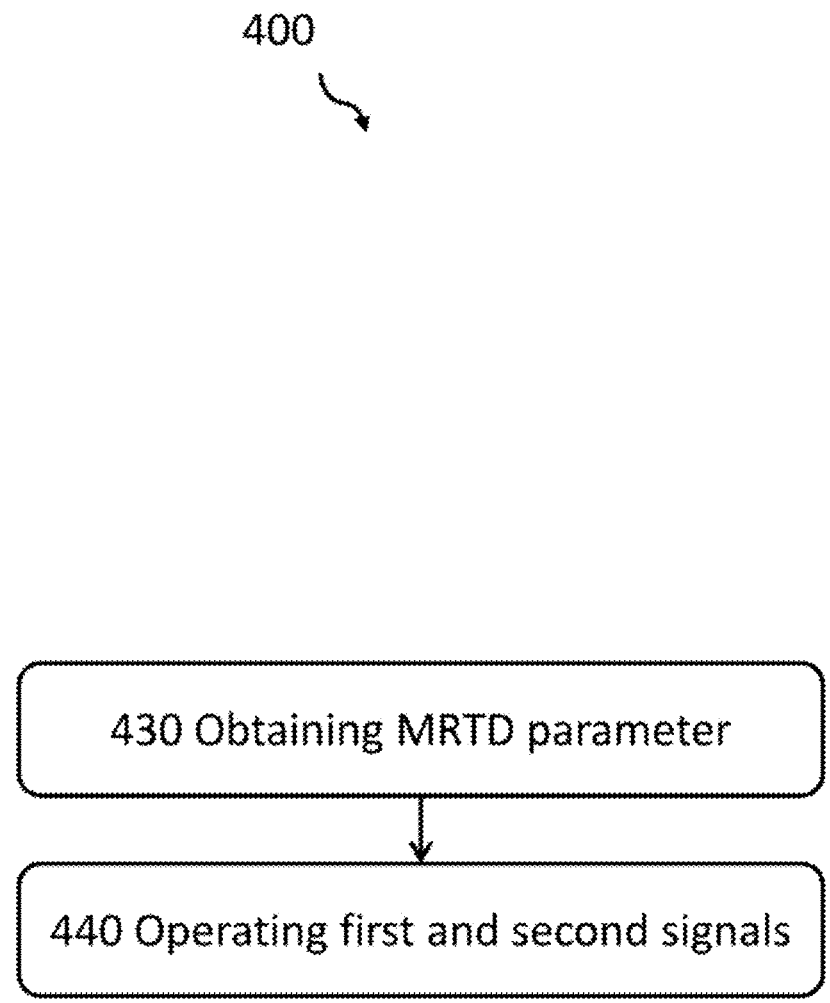
FIG. 3 shows a flowchart of a method for the wireless device according to an embodiment of the present disclosure.

FIG. 3 shows a flowchart of a method for a wireless device 100 according to an embodiment of the present disclosure. According to a first aspect, a method is provided that comprises the steps of obtaining 430 a maximum received time difference, MRTD, parameter and operating 440 a first signal S1 between the wireless device 100 and a first cell 210 of a network node 200 using the MRTD parameter and/or physical resources or resource blocks, RB, comprised in a first carrier F1, and operating a second signal S2 between the wireless device 100 and a second cell 220, e.g. of the network node 200, using the MRTD parameter and/or physical resources or RB:s, comprised in a second carrier F2 different from the first carrier F1.

In an embodiment, the MRTD parameter comprises maximum receive timing difference that indicates a maximum receive timing difference where the wireless device must and/or is allowed to perform multicarrier operation. In one example, the MRTD parameter is compared to a received timing difference ΔTr measured at the wireless device receiver between sub-frames received from the first and the second cell 210, 220.

In one embodiment, the wireless device 100 is further configured to send a configuration message or information message CM to the network node, wherein the configuration message or information message CM comprises a measured received timing difference ΔTr at the receiver of the wireless device 100.

In an example, the first cell may be a serving cell of a wireless device 100 in the form of a UE. Examples of a serving cell or a first or second cell 210, 220 are PCell, SCell, PSCell etc. The serving cell or first or second cell may be activated or deactivated. The term operating a signal may comprise transmitting or receiving a signal or to configure the transmittal or reception of a signal. The term operating a signal S1 between the first cell/cell1 and the UE herein may comprise of reception of the first signals S1 by the UE from cell1 or transmission of the first signals S1 by the UE to cell1. The term operating a signal S2 between the second cell/cell2 and the UE herein may comprise of reception of the second signal S1 by the UE from cell2 or transmission of the second signal S2 by the UE to cell2.

Examples of signals when receiving signals from cell1 at the UE are DL channel signals such as PDCCH, PDSCH, sPDCCH, sPDSCH etc. Examples of Signals when transmitting signals by the UE to cell1 are UL channel signals, such as PUCCH, PUSCH, sPUCCH, sPUSCH etc. In an embodiment, the wireless device 100 may obtain the maximum received time difference, MRTD, parameter by selecting from predetermined information or by receiving information from another wireless device or any other communication system 300 node e.g., as control signals and/or control signalling, or retrieving information from a memory 106 and/or other digital storage medium.

In yet an example, the UE may operate, e.g. receive and process, the received signals (S1 and S2) from cell1 and cell2 provided that the magnitude of the received timing difference ΔTr between S1 and S1 received at the UE does not exceed the determined value of MRTD.

In yet another example the UE may further decide to transmit signals to cell1 and/or on cell2 provided that measured ΔTr does not exceed the MRTD parameter value.

In an embodiment, the method further comprises using identical first TTI and second TTI when operating 440 the first signal (S1) and the second signal (S2). This may be true for both uplink and downlink. In other words, using identical TTI1 and TTI 2. In a further embodiment, the method further comprises using different first TTI and second TTI when operating (440) the first signal (S1) and/or the second signal (S2). This may be true for both uplink and downlink. In other words using different TTI1 and TTI2.

In an embodiment, the method further comprises using the first TTI, TTI12, when operating 440 the first signal S1 in uplink and using an alternative first TTI, TTI11, different from the first TTI, when operating 440, the first signal S1 in downlink, and using the second TTI, TTI22, when operating 440 the second signal S2 in uplink and using an alternative second TTI, TTI21, different from the second TTI, when operating 440, the second signal S2 in downlink.

In an embodiment, obtaining 430 the MRTD parameter comprises one or more of determining the MRTD parameter based on predetermined information, receiving the MRTD parameter comprised in at least one configuration message CM and/or received information and/or a received indication and determining the MRTD parameter based on a predetermined rule by calculating or evaluating one or more functions based on the first and second TTI (TTI1, TTI2) and/or based on at least one scaling factor K.

In an embodiment, at least one of the one or more functions is defined by the relation MRTD parameter=f(first TTI, second TTI, K).

In an embodiment, operating a first signal comprises receiving the first signal S1 by the wireless device 100 from the first cell 210 using the alternative first TTI, or transmitting the first signal S1 using an alternative first TTI. Operating a second signal (S2) further comprises receiving the second signal S2 by the wireless device 100 from the second cell 220 using the second TTI or transmitting the second signal S2 by the wireless device 100 to the second cell 220 using an alternative second TTI. A least one of the one or more functions is defined by MRTD parameter=f2(TTI11, TTI12, TTI21, TTI22, K), MRTD parameter=f3(TTI11, TTI21, TTI12) or MRTD parameter=f4(TTI11, TTI21, TTI22).

In an embodiment, the at least one scaling factor K may be obtained as a pre-defined value, obtained in a configuration message from a network node 200 or obtained by evaluating one or more functions based on the first TTI and the second TTI, wherein at least one of the one or more functions is defined by the relation K=f1(TTI1, TTT2).

In an embodiment, if TTI11 TTI21 or TTI12≠TTI22 the MRTD parameter is determined by aggregating the result of the one or more functions evaluated for each TTI using a combining function such as minimum, maximum, average or percentile.

In an embodiment, obtaining the MRTD parameter is performed by determining if the wireless device 100 operates in a synchronous or in an asynchronous mode of operation and setting the MRTD parameter to a value relatively smaller in magnitude when operating in the synchronous mode of operation than when operating in the asynchronous mode of operation or setting the MRTD parameter to a value relatively larger in magnitude when operating in the synchronous mode of operation than when operating in the asynchronous mode of operation.

In an embodiment, the method further comprising configuring and/or applying multicarrier operation based on the MRTD parameter.

In an embodiment, the method 400 further comprises using the MRTD parameter for performing one or more operational tasks.

In an embodiment, the operational tasks comprises a selection of any of starting/stopping multicarrier operation, deconfiguring, releasing or deactivating the first and/or second cell, configuring or activating the first and/or second cell, resuming multicarrier operation, performing uplink feedback transmission, demodulating of DL channels, performing CSI measurements on the first and/or second cell and reporting results of measurements.

Figure 4:
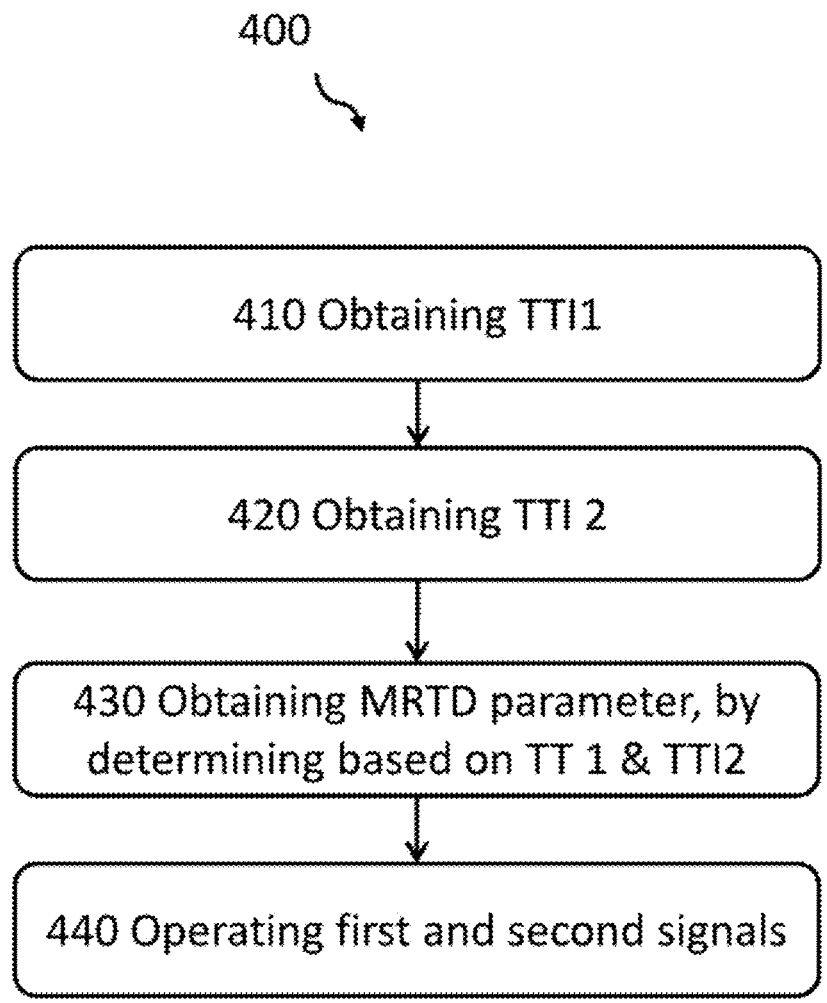
FIG. 4 shows a flowchart of a method for the wireless device according to a further embodiment of the present disclosure.

FIG. 4 shows a flowchart of a method for the wireless device according to a further embodiment of the present disclosure. According to a first aspect, the method 400 further comprising obtaining 410 a first transmission time interval, TTI1, at which the first signal S1 will be transmitted from the (first?) network node. The method further comprises obtaining 420 a second TTI TTI2 at which the second signal S2 is transmitted by the (second?) network node. The MRTD parameter may be obtained by determining the MRTD parameter based on the first and second TTI (TTI1, TTI2), e.g. by calculating a function dependent on predetermined information or a dependent on a predetermined rule, as further described in relation to FIG. 12. The MRTD parameter may further be obtained by receiving the MRTD parameter comprised in at least one configuration message (CM) and/or received information and/or a received indication, e.g. received from the network node 200.

In one example the first cell, also hereafter referred to as cell1, may correspond to DL serving cell. In this case TTI1 may correspond to the TTI of the DL serving cell. In another example cell1 may correspond to a UL serving cell. In this case TTI1 may correspond to the TTI of the UL serving cell. In yet another example the UE may further obtain TTI of DL cell1 as well as TTI of UL cell1. In one example DL and UL of cell1 may use the same TTI, while in another example different TTIs are used in DL and UL of cell1. The second TTI may relate to the UL and the DL in a similar manner.

In one embodiment, the wireless device 100 may obtain the first and second TTI TTI1, TTI2 by selecting from predetermined information or by receiving information from another wireless device or any other wireless communication system 300 node e.g. as control signals and/or control signalling, or retrieving information from a memory 106 and/or other digital storage medium. The control signals may comprise of signals, previously defined, comprising control information, e.g. MIB, PBCH and NPBCH etc.

In an embodiment, the first TTI, TTI1 and the second TTI,TTI2, are obtained by performing one of retrieving predetermined information, receiving at least one configuration message (CM) or by evaluating a predetermined rule. In a further embodiment, the first TTI (TTI1) and/or the second TTI (TTI2) is/are obtained by determining the first TTI (TTI1) and/or the second TTI (TTI2) based on predetermined information, receiving the first TTI (TTI1) and/or the second TTI (TTI2) comprised in at least one configuration message (CM), determining the first TTI (TTI1) and/or the second TTI (TTI2) based on a predetermined rule, or performing autonomous determination, such as blind detection.

In an example, TTI1 and TTI2 may be obtained based on one or more of the following mechanisms:
  pre-defined information e.g. relation between TTI1 and frequency band of F1
  configuration received from the network node e.g. PCell, SCell etc. For example the UE may determine the TTI pattern used in any time instance in any carrier by receiving control signals in DL or by receiving the RRC message
  pre-defined rule. Examples of rules are
    to apply same TTI as used in a reference cell. Examples of reference cell is PCell, PSCell.
    Based on TTI used in the opposite direction of cell1 e.g.
      Assume same TTI in UL and DL cell1.
      Assume UL cell1 uses TTI which is not shorter than the TTI of the DL cell1
  autonomous determination e.g. blind detection by the UE by attempting to decode DL channel of different predefine TTIs.

In one embodiment, the MRTD parameter is obtained by calculating or evaluating one or more functions based on the first and second TTI, as further described in relation to FIG. 12. The one or more functions may further be based on a scaling factor. In a further embodiment, wherein obtaining 430 the MRTD parameter comprises determining the MRTD parameter based on predetermined information, receiving the MRTD parameter comprised in at least one configuration message (CM) and/or received information and/or a received indication, the first TTI, TTI1, and/or the second TTI, TTI2, determining the MRTD parameter based on a predetermined rule by calculating or evaluating one or more functions based on a/the first and second TTI and/or based on a/the first and second TTI and a scaling factor K.

In one example, the MRTD parameter may be obtained by determining the MRTD parameter based on the first and second TTI by one or more of the following mechanisms:
  Information or indication received from the network node 200 or any other network or control node.
  By using or retrieving pre-defined information e.g. pre-defined rules, pre-defined requirements etc. In both mechanisms above, the MRTD can be determined by calculating or evaluating one or more functions.
  Examples of such functions are:
  One example of a general function for determining the MRTD can be expressed by $$(1): \text{MRTD}=f(\text{TTI1},\text{TTI2},K) \quad (1)$$

In (1) TTI1 and TTI2 are the TTI used in the DL of cell1 and DL of cell2 respectively. The parameter K is scaling factor. The value of K may be pre-defined or configured at the UE by the network node. The parameter K may further depend on TTIs e.g. K=f1(TTI1, TTT2).

In another example of a general function for determining the MRTD can be expressed by:

(2): MRTD=$f2$(TTI11,TTI21,TTI12,TTI22,$K$)     (2).

In (2) TTI11, TTI21 are the TTI used in the DL of cell1 and DL of cell2 respectively, and TTI12, TTI22 are the TTI used in the UL of cell1 and UL of cell2 respectively.

In yet another example of a general function for determining the MRTD can be expressed by (3): MRTD=$f$(TTI11,TTI21,TTI12)     (3)

In yet another example of a general function for determining the MRTD can be expressed by (4): MRTD=$f$(TTI11,TTI21 TTI22)     (4)

As special case TTI1=TTI2. Similarly as special case TTI11=TTI21, TTI12=TTI22, or even TTI11=TTI12=TTI21=TTT22. The value of MRTD further depends on whether the UE is configured for operating on cell1 and cell2 in synchronous or asynchronous mode of operation. For example in synchronous operation (e.g. synchronous DC) the magnitude of the MRTD is smaller than the magnitude of the MRTD supported by the UE in asynchronous mode of operation for the same sets of TTIs on cell1 and cell2.

In an embodiment operating 440 the first signal S1 and/or the second signal S2 further comprises configuring and/or applying multicarrier operation based on the MRTD parameter.

In an example, the UE uses the MRTD parameter for receiving signals from the first and second cell or cell1 and cell2. The UE may then configure or apply a CA configuration based on the determined value of the MRTD parameter. In yet an example, the UE may receive and process the received signals, S1 and S2, from cell1 and cell2 provided that the magnitude of the timing difference ΔTr between S1 and S1 received at the UE does not exceed the determined value of MRTD. In yet another example, the network node and/or the UE may further decide to transmit signals on cell1 and/or on cell2 provided that the estimated and/or received timing difference ΔTr does not exceed the determined value of MRTD i.e. threshold related to ΔTr. In yet another example, The UE compares the timing difference ΔTr between the two signals received, S1 and S2. If ΔTr is less than the MRTD parameter, the UE receives and or transmits in the TTIs assigned to it in the respective cell of the CA/DC, i.e. using the signals S1 and S2. If the timing difference ΔTr exceeds that of the MRTD parameter, the UE will no longer receive or transmit in the two or more cells, i.e. using the signals S1 and S2. The UE will then select to communicate using just one of the signals S1 and S2, typically the signal S1 associated with the primary cell, Pcell, and send a configuration message CM informing the node 200 that the timing difference ΔTr Tr exceeds that of the MRTD parameter.

In one embodiment, the method 400 further comprises using the MRTD parameter for performing one or more operational tasks.

Examples of operational tasks are:
starting/stopping multicarrier operation. For example if the measured time difference ΔTr is larger than the MRTD parameter, then the UE may not apply the CA configuration for cell1 and cell2 and then continue to communicate in just one of these cells until the network provides a new configuration which result in a MRTD long enough for the measured time difference ΔTr to fit, deconfiguring, releasing or deactivating cell(s). For example if the estimated ΔTr is larger than the determined MRTD, then the UE may deconfigure, release or deactivate at least one of cell1 and cell2, activating cell(s). For example if the measured time difference ΔTr is not larger than the determined MRTD, then the UE may activate at least one of deactivated cell1 and deactivated cell2, resuming multicarrier operation. For example if the measured time difference ΔTr is not larger than the MRTD parameter, then the UE may apply the CA configuration by receiving and/or transmitting in cell1 and cell2, uplink feedback transmission, demodulation of DL channels, performing CSI measurements on cell1 and/or on cell2.

Reporting results of measurements e.g. CQI to network node

Figure 5:
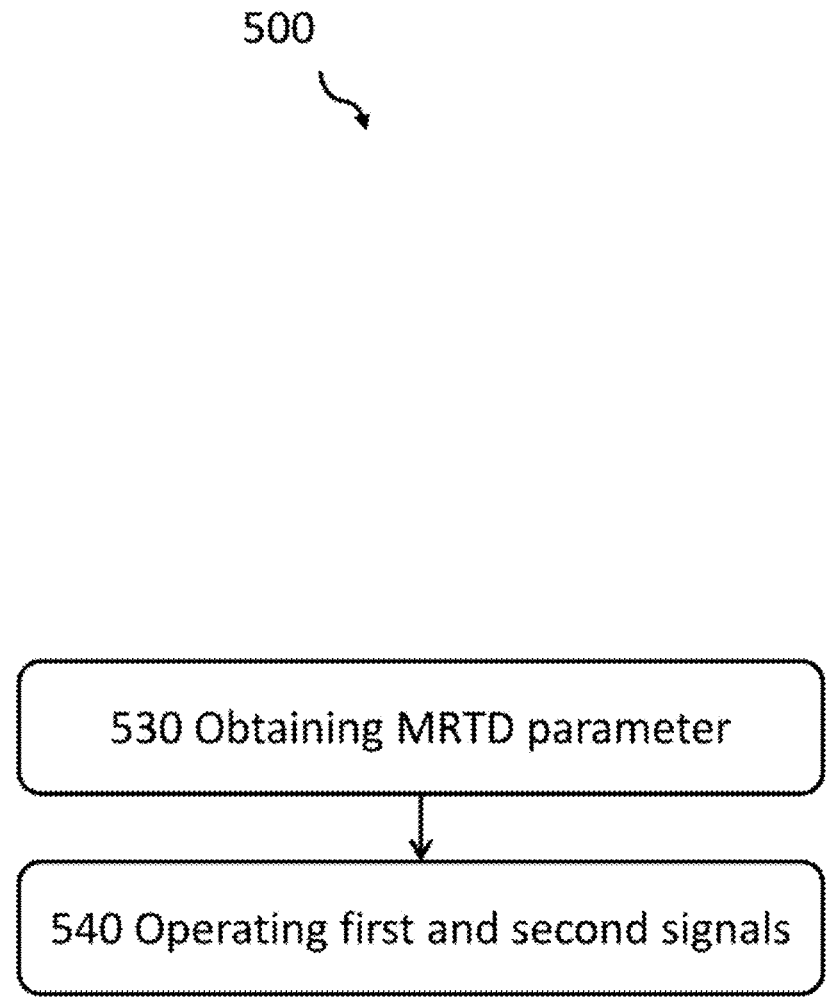
FIG. 5 shows a flowchart of a method for a network node according to an embodiment of the present disclosure.

FIG. 5 shows a flowchart of a method for a network node 200 according to an embodiment of the present disclosure. A method 500 is provided for a network node 200 configured for communication in a wireless communication network 300, the method comprising:

obtaining 530 a maximum, received time difference, MRTD, parameter, and operating 540 a first signal S1 between the wireless device 100 and a first cell 210 of a network node 200 using the MRTD parameter and a first carrier F1 and a second signal S2 between the wireless device 100 and a second cell 220 of the network node 200 using the MRTD parameter and a second carrier F2 different from the first carrier F1.

In one example, obtaining 430 the MRTD parameter is performed by estimating the maximum relative propagation delay difference between S1 and S2, plus timing alignment error at the first cell 210 and the second cell 220, e.g. the Pcell and SCell.

As mentioned above, operating the first signal S1 between the wireless device 100 and the first cell 210 typically involves transmitting the first signal S1 to the wireless device 100 or receiving the first signal S1 from the wireless device 100. In a similar manner, operating the second signal S2 between the wireless device 100 and the second cell 220 typically involves transmitting the second signal S2 to the wireless device 100 or receiving the second signal S2 from the wireless device 100.

In an embodiment, the MRTD parameter comprises or indicates a maximum receive timing difference indicating an maximum difference between sub-frames received from a first and second cell 210, 220 which would allow the wireless device receiver to perform multicarrier CA operation.

In an embodiment, the network node may obtain the maximum received time difference, MRTD, parameter by selecting from predetermined information or by receiving information from another wireless device or any other communication system 300 node e.g. as control signals and/or control signalling, or retrieving information from a memory 106 and/or other digital storage medium.

In an embodiment, operating the first signal S1 between the wireless device 100 and the first cell 210 of the network node 200 comprises receiving the first signal S1 by the first cell 210 the from wireless device 100 or transmitting the first signal S1 by the first cell 210 to the wireless device 100, and wherein operating the second signal S2 between the wireless device 100 and the second cell 220 of the network node 200 comprises receiving the second signal S2 by the second cell 220 from the wireless device 100 or transmitting the second signals S2 by the second cell 220 to the wireless device 100.

In one embodiment, the network node 200 is further configured to receive a configuration or information(?) message CM from the wireless device 100, wherein the configuration or information message CM comprises a measured timing difference ΔTr at the wireless device 100.

In one embodiment, when the network node 200 determines that the measured received timing difference ΔTr exceeds the MRTD parameter, in order to obtain replace the current MRTD parameter value with another larger one that the measured timing difference ΔTr can fit within, the network node may initiate a new CA/DC configuration, release the CA/DC configuration such that communication will continue in just one cell, or initiates a new TTI configuration will current CA/DC operation is maintained.

Alternatively, the network node 200 may further be configured to deactivate current PScell and activate a new PSCellassign or to configure a new Pcell.

In one embodiment, when the network node 200 determines that the measured timing difference ΔTr exceeds the MRTD parameter, in order to replace the current MRTD parameter value with another larger one that the measured timing difference ΔTr can fit within. The network node may then initiate a new CA/DC configuration, release the CA/DC configuration such that communication will continue in just one cell, or initiates a new TTI configuration will current CA/DC operation is maintained.

In an example, operating the first and second signals S1, S2 comprises transmitting at least one of the signals, S1 and S2 using TTI1 and TTI2 respectively on cell1 and cell2 respectively, based on the MRTD parameter. For example the network node ensures that the transmitted signals S1 and S2 are received at the UE within the MRTD parameter. This may be achieved by changing the configuration of the UE by the network node 200 in order to increase the MRTD parameter value, e.g. when obtaining information that the measured time difference ΔTr exceeds the MRTD parameter value. For example if the magnitude of the received time difference ΔTr of the signals S1 and S2 at the UE is expected to exceed the magnitude of MRTD then the network node may transmit S1 and S2 to the UE in different time resources. The network node may determine the value of ΔTr by receiving it from the UE.

In an embodiment, the method 500 further comprises using identical first TTI and second TTI when operating 540 the first signal S1 and the second signal S2. This may apply to communication using the first signal S1 and the second signal S2 both uplink and downlink. In other words, using identical TTI1 and TTI2. In a further embodiment, the method 500 further comprises using different first TTI and second TTI when operating 540 the first signal S1 and/or the second signal S2. This may apply to communication using the first signal S1 and the second signal S2 both uplink and downlink. In other words using different TTI1 and TTI2.

In an embodiment, the method further comprises using the first TTI, TTI12, when operating 540 the first signal S1 in uplink and using an alternative first TTI TTI11, different from the first TTI, when operating 540 the first signal S1 in downlink. In other words, using different TTIs uplink and downlink when operating 540 the first signal S1. The method further comprises using the second TTI, TTI22, when operating 540 the second signal S2 in uplink and using an alternative second TTI, TTI21, different from the second TTI, when operating 540 the second signal S2 in downlink. In other words, using different TTIs uplink and downlink when operating 540 the second signal S2.

In an embodiment, the method further comprises configuring the wireless device 100 by sending the MRTD parameter comprised in at least one configuration message CM. The method may further comprise ensuring that MRTD parameter can be supported by the UE.

In an embodiment, the method further comprises configuring the wireless device 100 by sending information indicative of first TTI, TTI1 and/or the second TTI, TTI2, comprised in at least one configuration message, CM.

In an embodiment, the MRTD parameter is obtained 530 by determining the MRTD parameter based on information indicative of one or more of deployment scenario, estimated coverage area of the first and second cell or a capability of the wireless device 100 and the first transmission time interval, TTI, TTI1, used for transmission timing of the first signal S1 and the second TTI, TTI2, used for transmission timing of the second signal S2 based on the determined MRTD parameter.

In an embodiment, the method further comprises obtaining 510 the first TTI, TTI1, and the second TTI, TTI2, by determining the first TTI, TTI1, and the second TTI, TTI2, based on any combination of capability of the wireless device 100, required bit rate of the wireless device 100, round trip time, RTT, required to deliver data packet between the wireless device 100 and the network node 200 or relative distance between the wireless device 100 and the network node 200.

In an embodiment, the method 500 further comprises using the MRTD parameter for performing one or more operational tasks. The operational tasks may comprise a selection of starting/stopping multicarrier operation, deconfiguring, releasing or deactivating the first and/or second cell, configuring or activating the first and/or second cell, resuming multicarrier operation, or modifying the first or second TTI.

Figure 6:
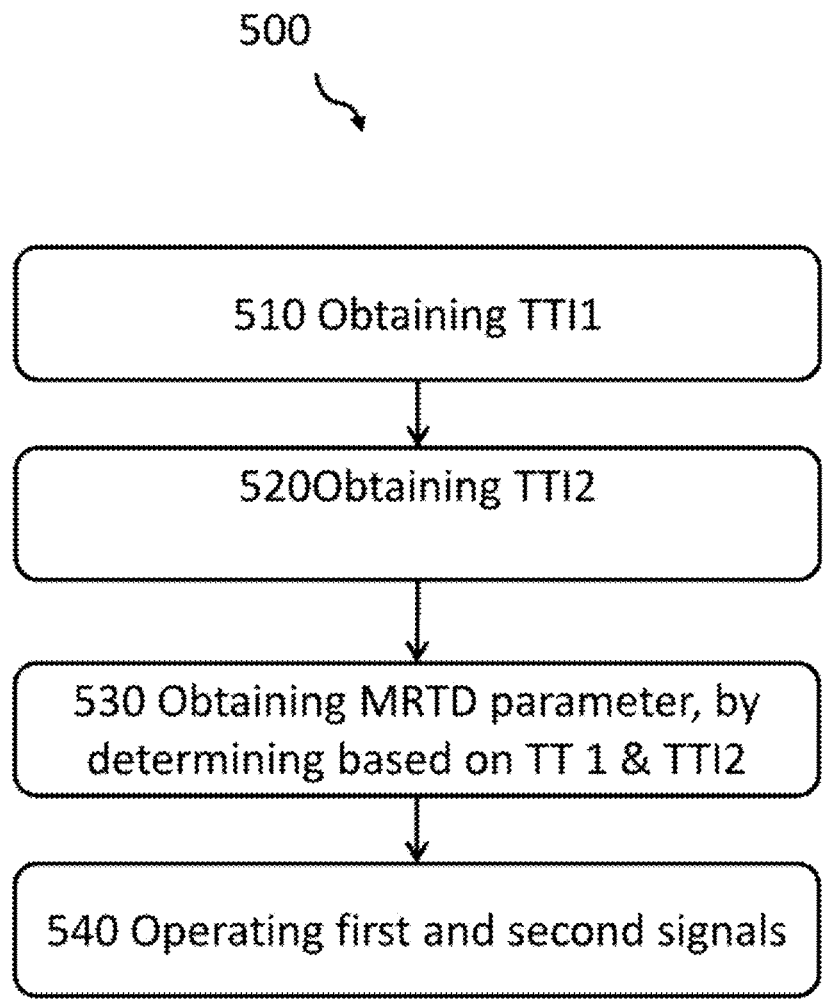
FIG. 6 shows a flowchart of a method for the network node according to a further embodiment of the present disclosure.

FIG. 6 shows a flowchart of a method for the network node according to a further embodiment of the present disclosure. The method further comprising:

obtaining 510 a first TTI used for transmission timing of the first signal S1, obtaining 520 a second TTI used for transmission timing of the second signal S2, wherein the MRTD parameter is obtained by determining the MRTD parameter based on the first and second TTI (TTI1, TTI2).

In one embodiment, the MRTD parameter is obtained by determined by calculating or evaluating one or more functions based on the first and second TTI as further described in relation to FIG. 12. The one or more functions may further be based on a scaling factor. In one embodiment, the method further comprising obtaining 510 the first TTI and the second TTI by determining the first TTI and the second TTI based on capability of the wireless device 100, required bit rate of the wireless device 100, round trip time, RTT, required to deliver data packet between the wireless device 100 and the network node 200 or relative distance between the wireless device 100 and the network node 200.

In an example, the network node 200 may determine the value of the first and second TTI. The network node may determine the value of the first and second TTI based on for example one or more of the following principles:

UE capability whether it supports two or more different TTIs e.g. TTI=1 ms and TTI=0.14 ms.

The required UE bit rate.

The round trip time (RTT) required to deliver data packet between UE and the network node e.g. shorter TTI is used in case shorter RTT is required.

The UE location with regards to the serving cell. For example shorter TTI may be used when the UE is located close to the network node serving cell1, as compared to when they are spaced apart at greater distance.

In an embodiment, the method further comprises configuring the wireless device 100, e.g. a UE, with a first TTI, TTI1, used for operating a first signal, S1, between the first cell 210 on a first carrier F1 and with a second TTI, TTI2 used for operating the second signal S2 between the second cell on the second carrier F1. In an embodiment, the method further comprising configuring the wireless device 100 by sending at least one configuration message, CM, to the UE with information of the first TTI TTI1 and/or the second TTI TTI2.

Figure 7:
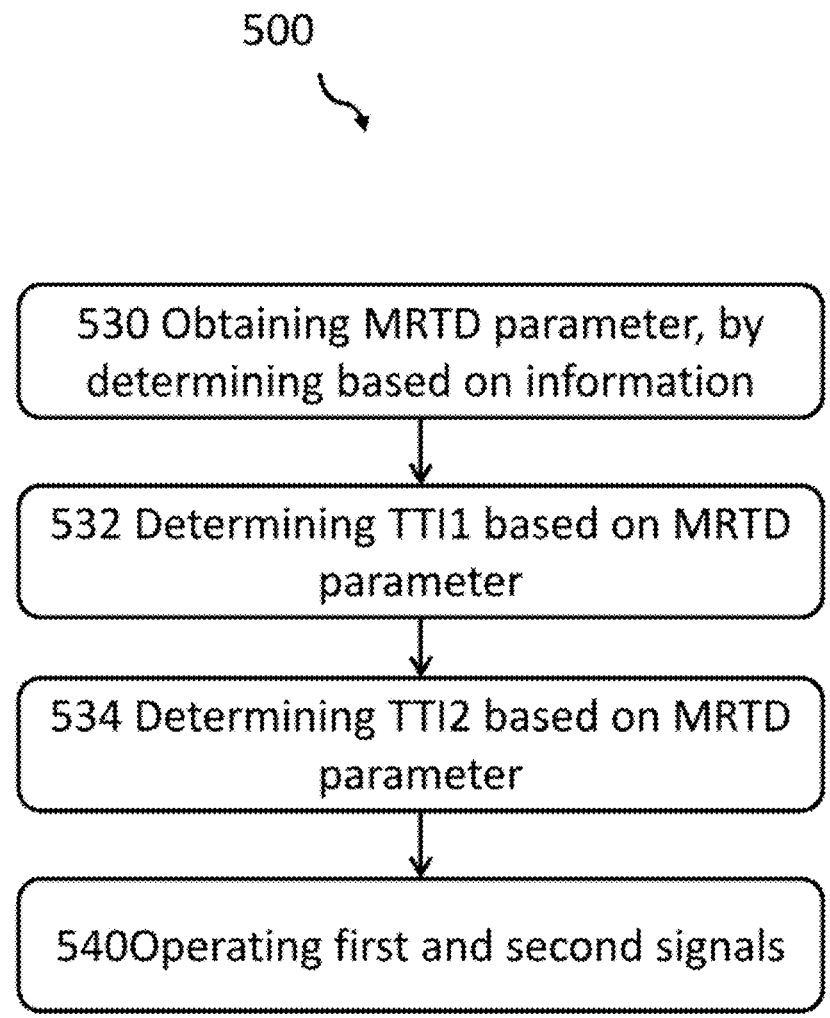
FIG. 7 shows a flowchart of a method for the network node according to yet a further embodiment of the present disclosure.

FIG. 7 shows a flowchart of a method for the network node according to yet a further embodiment of the present disclosure. The method 500 further comprises obtaining 530 the MRTD parameter by determining the MRTD parameter based on information indicative of one or more of:

deployment scenario, estimated coverage area of the first and second cell or a capability of the wireless device 10), and a first transmission time interval, TTI1 used for transmission timing of the first signal S1 and a second TTI, TTI2, used for transmission timing of the second signal S2 based on the determined MRTD parameter.

In an example, the network node 200 determines a MRTD parameter to be used by a UE for operating the first signal S1 between the first cell 210 on the first carrier F1 and the wireless device 100, and for operating the second signal S2 between the second cell 220 on a second carrier F2 and the wireless device 100. The network may determine the value of the MRTD parameter for example based on one or more of the following:

Deployment scenario e.g. cell range of cell1 and cell2.
UE coverage with regards to cell1 and cell2. For example this can be determined based on the measured signals from cell1 and cell2 and reported by the UE to the network node.
UE capability in terms of maximum value of the MRTD parameter supported by the UE. For example the UE can signal this information to the network node.
The UE capability in terms of supported TTIs e.g. TTI=0.14 ms, TTI=0.5 ms, TTI=1 ms.

In an embodiment, the method 500 further comprises the step of using the determined MRTD parameter for performing one or more operational tasks. In a further embodiment, the operational tasks comprises a selection of starting/stopping multicarrier operation, deconfiguring, reconfiguring, releasing or deactivating the first and/or second cell, configuring or activating the first and/or second cell, resuming multicarrier operation, modifying the first or second TTI.

Examples of operational tasks are:
starting/stopping multicarrier operation. For example if the estimated ΔTr is larger than the determined MRTD, then the network node may UE may deconfigure one of the two serving cells (cell1 and cell2),
reconfiguring, releasing or deactivating cell(s). For example if the estimated ΔTr is larger than the determined MRTD, then the network node may deconfigure, release or deactivate at least one of cell1 and cell2, and reconfigure another serving cell e.g. cell3,
resuming multicarrier operation. For example if the estimated ΔTr is not larger than the determined MRTD, then the network node may reconfigure previously deconfigured cell1 and/or cell2,
modifying TTI1 and/or TTI2. For example if the estimated ΔTr is larger than the determined MRTD, then the network node may change the TTI1 and/or TTI2. This in turn will change MRTD.

Figure 9A:
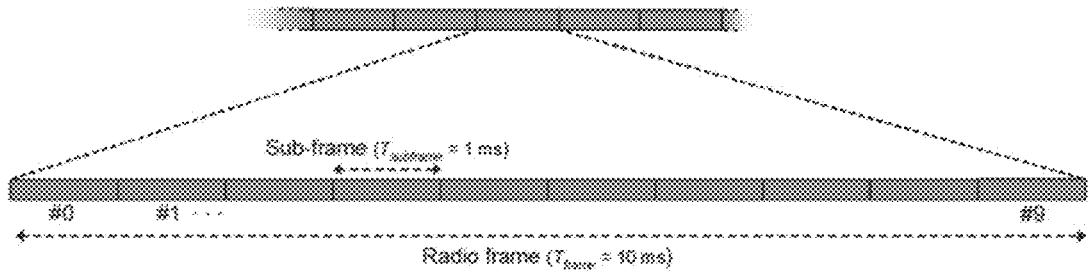
FIG. 9A shows a frame structure according to an embodiment of the present disclosure.

FIG. 9A shows a frame structure according to an embodiment of the present disclosure. The wireless communication network 300 may be conforming to LTE or LTE Advanced. LTE may use OFDM access technology in the downlink and DFT-spread OFDM in the uplink. In the time domain, LTE downlink transmissions are organized into radio frames of 10 ms, each radio frame consisting of ten, e.g. equally-sized, sub-frames of length Tsub-frame=1 ms. FIG. 9A schematically shows the LTE time-domain frame or radio frame structure. Furthermore, the resource allocation in LTE is typically described in terms of resource blocks, RB:s, where a resource block corresponds to one slot or 0.5 ms in the time domain and 12 contiguous subcarriers in the frequency domain. A pair of two adjacent resource blocks in time direction corresponding to 1.0 ms is known as a resource block pair. This is also denoted as Transmission Time Index or Transmission Time Interval TTI. Downlink transmissions may be dynamically scheduled, i.e. in each sub-frame the base station transmits control information about to which terminals data is transmitted and upon which resource blocks the data is transmitted, in the current downlink sub-frame. This control signaling is typically transmitted in the first 1, 2, 3 or 4 OFDM symbols in each sub-frame and the number n=1, 2, 3 or 4 is known as the Control Format Indicator, CFI, indicated by the physical CFI channel, PCFICH, transmitted in the first symbol of the control region. The control region also contains physical downlink control channels, PDCCH, and possibly also physical HARQ indication channels PHICH, carrying ACK/NACK for the uplink transmission.

Figure 9B:
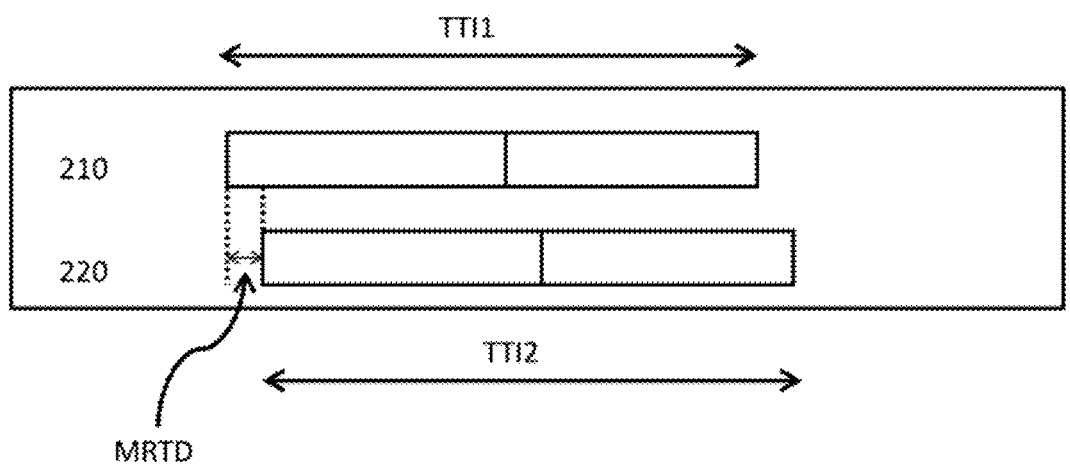
FIG. 9B shows an example of a Maximum Receive Timing Difference between sub-frames received from a first and second cell 210, 220 according to an embodiment of the present disclosure.

FIG. 9B shows an example of the difference in timing of two subframes sub-frames received by a UE from a respective of a first and a second cell 210, 220 according to an embodiment of the present disclosure. In the example shown in FIG. 9B, the first cell 210 is operating the first signal S1 using the first transmission time interval TTI1 for transmission or transmission timing of the first signal S1, e.g. operating S1 by transmitting S1. Further, the second cell 220 is operating the second signal S2 using the second transmission time interval TTI2 for transmission or transmission timing of the first signal S2, e.g. operating S2 by transmitting S2. Due to various factors the first and second signal S1, S2 will be received with different receiving timing. The main factors are:

relative propagation delay difference between the first and second cell 210, 220.
transmission timing difference between the first and second cell 210, 220.
delay difference due to multipath propagation of the first and second signals S1, S2.

The MRTD parameter indicates the maximum difference in time allowed at the wireless device receiver between the first signal S1 and the second signal S2.

In on example, packet data latency is one of the performance metrics that vendors, operators and also end-users monitor, e.g. via speed test applications. Latency measurements are done in all phases of a wireless communication network or radio access network system lifetime. E.g. when verifying a new software release or system component, when deploying a system and when the system is in commercial operation. Shorter latency than previous generations of 3GPP RATs was one performance metric that guided designing of Long Term Evolution (LTE). LTE is also now recognized by the end-users to be a system that provides faster access to internet and lower data latencies than previous generations of mobile radio technologies. Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions. Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system. The inventors have realized that one area to address, when it comes to packet latency reductions, is the reduction of transport time of data and control signaling. This may be achieved by addressing the length of the transmission time interval. In the example of LTE release 8, a TTI corresponds to one sub-frame, SF, having a length of 1 millisecond. One such 1 ms TTI is constructed by using 14 OFDM or SC-FDMA symbols in the case of normal cyclic prefix and 12 OFDM or SC-FDMA symbols in the case of extended cyclic prefix. In relation to specification work concerning LTE release 13, a study item has been started, with the goal of specifying transmissions with shorter TTIs that are much shorter than the LTE release 8 TTI. The shorter TTIs may be determined to have any duration in time and comprise resources on a number of OFDM or SC-FDMA symbols within a 1 ms SF. As one example, the duration of the short TTI may be 0.5 ms, i.e. seven OFDM or SC-FDMA symbols for the case with normal cyclic prefix. As another example, the duration of the short TTI may be 2 symbols.

Figure 10:
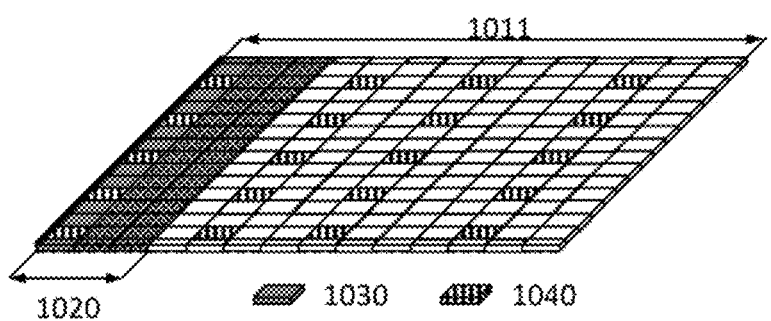
FIG. 10 shows an example of a sub-frame according to an embodiment of the present disclosure.

FIG. 10 shows an example of a sub-frame according to an embodiment of the present disclosure. As seen in FIG. 10, the sub-frame may correspond to a TTI length 1010 consisting of 14 OFDM symbols. The downlink sub-frame may further comprise common reference symbols 1040, CRS, which are known to the receiver and used for coherent demodulation of information in the first or second signal S1, S2, e.g. the control information. The downlink sub-frame may further comprise a control region 1020 that carries control signaling 1030. The sub-frame comprises CFI=3 OFDM symbols as the control region 1020. As an example, in a Rel-8 TTI, one such portion of the DL transmission is termed as one TTI.

In an embodiment, the TTI length of TTI1 or TTI2 may be 2-OFDM symbols, 4-OFDM symbols or 7-OFDM symbols. These are denoted as: 2-OS sTTI, 4-OS sTTI, 7-OS sTTI, respectively. The shortened TTI can be used in different values in different direction, e.g. using different TTI length for the downlink, DL, direction from the network node 200 to the wireless device 100 and uplink, UL. IN an example, a DL transmission may be using the 2-OS sTTI, while a corresponding UL transmission may be using 4-OS sTTI in the same cell 210, 220. Different frame structures, such as LTE frame structures FS1, FS2 and FS3, may use different sTTI:s. The time domain structure in FIG. 9A relates to FS1. TTI lengths of 2-OS, 4OS and 7 OS TTI are usable for FS1. For FS2 which is used for TDD, 7-OS sTTI is one of the shortened TTI mode.

In an embodiment, the cells 210, 220 of the network node 200 may be configured for multicarrier operation, such as CA or DC. In CA the wireless device 100 may be configured with a primary CC, cell or serving cell 210, 220 which is referred to as the Primary Cell or PCell. The PCell is may be configured to provide the wireless device 100 with control information by transmitting control signals. The wireless device 100 may be configured to perform monitoring of the radio quality on the first cell 210 or PCell. The wireless device 100 may be configured as a CA capable terminal. This may involve being configured with additional carriers, cells or serving cells which are referred to as Secondary Cells, SCells. The first cell 210 may be configured as a PCell or as an SCells. The second cell 212 may be configured as a PCell or as a SCell. In an example, the wireless device 100 is configured for dual connectivity, DC, operation. When the wireless device 100, e.g. in RRC_CONNECTED state, may be configured with a Master Cell Group, MCG, and a Secondary Cell Group, SCG. A Cell Group, CG, is a group of serving cells associated with either the MeNB or the SeNB, respectively. The MCG may be defined as a group comprising serving cells associated with the MeNB, including the PCell and optionally one or more SCells. The SCG may be defined as a group comprising serving cells associated with the SeNB comprising the Primary SCell, pSCell, and optionally one or more SCells.

The wireless device 100 may be configured for CA and further be configured with at least one Timing Advance Group, TAG. In an example, the TAG may be a primary TAG, pTAG, and comprise at least the PCell. The pTAG may also comprise one or more SCells. The wireless device 100 may further be configured to or capable of supporting multiple timing advance values. The wireless device 100 may further be configured with one or more serving cells for operating in uplink, where the cells are comprised in one or more secondary Timing Advance Groups sTAGs, in addition to pTAG.

The wireless device 100 configured to support dual connectivity may be configured with one pTAG and may also be configured with one primary secondary Timing Advance Group psTAG. The pTAG may comprise the PCell and may in addition comprise one SCell. The psTAG shall contain the PSCell and may also contain one SCell, if configured. Within the cells comprised in the pTAG, the wireless device 100 may use the PCell as the reference cell for deriving the wireless device 100 transmit timing for the pTAG. Within the cells comprised in the psTAG, the wireless device 100 may use the PSCell as the reference cell for deriving the UE transmit timing for psTAG.

FIG. 11 shows different scenarios involving different TTI patterns according to one or more embodiments of the present disclosure. By TTI pattern is here meant the length of TTIs, that are used in the two cells engaged in the CA/DC with the UE. The TTI may be specific for the UL, the DL or both in the respective of the cells. The alternative combinations of TTI lengths in the respective cells, as may be applied in UL and or DL, are the TTI patterns that is here referred to. In an embodiment, the method further comprises using identical first TTI and second TTI when operating 440 the first signal S1 and/or the second signal S2 in uplink and downlink, using different first TTI and second TTI when operating 440 the first signal S1 and/or the second signal S2 in uplink and downlink. In a further embodiment, the method further comprising using a first TTI, when operating 440 the first signal S1 in uplink and using a an alternative first TTI when operating 440 the first signal S1 in downlink, and/or using a second TTI when operating 440 the second signal S2 in uplink and using a an alternative second TTI when operating 440 the second signal S2 in downlink.

In a first example scenario, the same TTI pattern is used in different carriers involved in carrier aggregation. The first cell 210 is operating in the first carrier or frequency F1 and uses a 1st TTI pattern, while the second cell 220 operating in the second carrier or frequency F2 uses the same TTI pattern. The wireless device 100 or a UE aggregates the first cell 210 and the second cell 220 in one CA configuration. In a second example scenario, different TTI patterns are used in different carriers involved in carrier aggregation. The first cell 210 operating in the first carrier/frequency F1 uses a 1st TTI pattern TTI1, while the second cell 220 operating in the second carrier/frequency F2 uses a 2nd TTI pattern TTI2. The wireless device 100 or a UE aggregates the first cell 210 and the second cell 220 in one CA configuration. In a third example scenario, different TTI patterns are used in UL and DL of any carrier involved in carrier aggregation. The first cell 210 operating in the first carrier/frequency F1 uses a 1st TTI pattern in UL TTI1_UL, while it uses a 2nd TTI pattern in DL TTI1_DL. The second cell 220 operating in the second carrier/frequency F2 uses the 1st TTI pattern in UL while it uses the 2nd TTI pattern in DL. The wireless device 100 or a UE aggregates the first cell 210 and the second cell 220 in one CA configuration. In a variation of this example, the first cell 210 operating in the first carrier/frequency F1 uses a 1st TTI pattern in UL, while it uses a 2nd TTI pattern in DL. The second cell 220 Cell2 operating in the second carrier/frequency F2 uses a 3rd TTI pattern in both UL and DL. The wireless device 100 or a UE aggregates the first cell 210 and the second cell 220 in one CA configuration.

FIG. 12 shows specific examples of how the MRTD parameter value is determined based on alternative TTI configurations for CA/DC. In one example of the predetermined rule the MRTD parameter value is reduced in a linear fashion for different shortened TTI as shown in FIG. 12 table 1. In table 1 it is assumed that same TTI is used in both cells: first cell/cell1 and second cell/cell2. Here a linear scaling is used to determine corresponding TA adjustment step size. The table 1 below is valid for the case, when 1 ms TTI consists of 14 OFDM symbols (with normal cyclic prefix length). Table 1 show MRTD as the predetermined rule as a function of TTI length based on linear scaling with respect to TTI length assuming TTI in cell1 and cell2 are the same. Alternatively, the MRTD can be non-linearly scaled as shown in FIG. 12 table 2 assuming same TTI is used in both cells: cell1 and cell2. Table 2 shows MRTD as a function of TTI length based on non-linear scaling with respect to TTI length.

In previous examples in tables 1 and 2 the scaling of the MRTD as function of TTI length is pre-defined. In yet another example MRTD is scaled by scaling factor which can be configured by the network node at the UE. The scaling can be linear or non-linear. This is shown in FIG. 12 table 3. Values of K1, K2, K3 and K4 are configurable. As an example K1 can be 1. In this example in table 3 as well the same TTI is used in both cells: cell1 and cell2. Table 3 shows MRTD as function of TTI length based on configurable scaling factor.

In yet another example where the MRTD is scaled by a scaling factor which can be configured by the network node at the UE is shown in FIG. 12 table 4. In this example (table 4) L1, L2, L3 and L4 are configurable. As an example L1=(30+0.26). In this example in table 4 as well the same TTI is used in both cells: cell1 and cell2. Table 4 shows MRTD as function of TTI length based on configurable scaling factor.

In yet another example the same MRTD can be defined for a group of TTIs. For example one smaller value of MRTD can be defined for a set of TTIs of shorter duration and one larger value of MRTD can be defined for set of TTIs of longer duration. This is shown below in FIG. 12 table 5. In this example in table 5 as well the same TTI is used in both cells, cell1 and cell2. Table 5 shows MRTD as function of TTI length; same MRTD for group of TTIs.

In yet another example the MRTD values can be defined for synchronous and asynchronous operation for the same length of TTIs used in cell1 and cell2. This is shown in FIG. 12 table 6. Table 6 shows MRTD as function of TTI length for synchronous and asynchronous operations assuming same TTI in cell1 and cell2.

In another set of examples: if two cells (e.g, cell1 and cell2) in any CA combination uses a different 1st and a 2nd TTI pattern (i.e. TTI1≠TTI2), respectively, then the corresponding MRTD for the 1st and 2nd carrier can be defined as MRTD1 and MRTD2, respectively. The UE may obtain or determine the resulting MRTD (aka effective MRTD or simply MRTD) by using any of the following exemplary rules:

MRTD=g{MRTD1, MRTD2}
    MRTD=g1{MRTD1, MRTD2, X} where X can be any number, e.g. 0, 30.26, etc.
    MRTD=g2{MRTD1, MRTD2, Y}, where Y can be any number, e.g. 0, 20, etc. Examples of functions, g, g1 and g2, are minimum, maximum, average, xth percentile etc.
    MRTD=Max{MRTD1, MRTD2, X}, where X can be any number, e.g. 0, 30.26, etc
    MRTD=Min{MRTD1, MRTD2, Y}, where Y can be any number, e.g. 0, 20, etc. X and Y can be predefined and stored in UE. This can also be signaled to the UE from the network (or from another UE).

In another example, the MRTD related to the PCell is always used as the obtained or effective MRTD. The effective MRTD is defined based on a reference TTI pattern. In one example the effective MRTD is defined based on DL TTIs used in cell1 and/or cell2. In another example the effective MRTD is defined based on UL TTIs used in cell1 and/or cell2. As a non-limiting example, if cell1 is the PCell, then MRTD1 is used as resulting MRTD or effective MRTD or final MRTD or overall MRTD. In another example, if cell1 and cell2 is related to heterogeneous deployment where cell1 and cell2 are deployed as different layers, then if cell1 is wider area cell, then MRTD1 is always used as effective MRTD. In another non-limiting example, if cell1 operates in frequency F1 and cell2 operates in frequency F2, then if F1<F2, then MRTD1 is always used as effective MRTD.

Several options are available for determining the MRTD of UL and DL. Once the corresponding MRTD values for UL and DL are determined, the UE can decide on the obtained or effective MRTD by applying or following any of these rules:

MRTD related to DL TTI patterns are always used as effective MRTD
    MRTD related to longer TTI pattern is used as effective MRTD
    The maximum values of MRTD for UL and DL are used as effective MRTD; e.g. Max{MRTD_UL, MRTD_DL, Z}, where Z can be any number, e.g. 0, 30.26, etc Z can be predefined and stored in UE. This can also be signaled to the UE from the network (or from another UE).

Further Embodiments

FIG. 13 shows aspects of 3GPP TS 36.133 v14.1.0.

The following sections refer to topics discussed in 3GPP TS 36.133 v14.1.0, e.g. 3GPP TS 36.133 v14.1.0:

Maximum Transmission Timing Difference in Carrier Aggregation

A UE shall be capable of handling a relative received time difference between the PCell and SCell to be aggregated in inter-band CA and intra-band non-contiguous CA.Minimum requirements for interband carrier aggregation, are that the UE shall be capable of handling at least a relative received time difference between the signals received from the PCell and the SCell at the UE receiver of up $\Delta Tr$ µs as defined in FIG. 13 Table 7.9.2-1, when one SCell is configured. When two, three, or four SCells are configured, the UE shall be capable of handling at least a relative propagation delay difference between the signals received from any pair of the serving cells (PCell and the SCells) at the UE receiver of up to $\Delta Tr$ µs as defined in FIG. Table 7.9.2-2. The UE shall be capable of handling a maximum uplink transmission timing difference between the pTAG and the sTAG of at least 32.47 µs provided that the UE is configured with inter-band CA and configured with the pTAG and the sTAG. A UE configured with pTAG and sTAG may stop transmitting on the SCell if, after timing adjusting due to received TA command, the uplink transmission timing difference between PCell and SCell exceeds the maximum value the UE can handle, as specified above. The UE shall be capable of handling a maximum uplink transmission timing difference between the pTAG and any of the two sTAGs or between the two sTAGs of at least 32.47 µs provided that the UE is configured with inter-band CA and configured with the two sTAGs. A UE configured with two sTAGs may stop transmitting on the SCell if after timing adjusting due to received TA command the uplink transmission timing difference between SCell in one sTAG and SCell in other sTAG exceeds the maximum value the UE can handle as specified above. Table 7.9.2-1 shows relative received time difference ($\Delta Tr$) between the signals received from the PCell and the SCell. Table 7.9.2-2: shows relative received time difference ($\Delta Tr$) between the signals received from the PCell and any SCell or between any two SCells. Minimum requirements for intraband non-contiguous carrier aggregation are that the UE shall be capable of handling at least a relative received time difference between the signals received from the PCell and the SCell at the UE receiver of up to $\Delta Tr$ µs as defined in Table 7.9.2-1, The UE shall be capable of handling a maximum uplink transmission timing difference between the pTAG and the sTAG of at least 32.47 µs provided that the UE is configured with intra-band non-contiguous CA and configured with the pTAG and the sTAG. A UE configured with pTAG and sTAG may stop transmitting on the SCell if after timing adjusting due to received TA command the uplink transmission timing difference between PCell and SCell exceeds the maximum value the UE can handle as specified above. Minimum requirements for inter-band carrier aggregation under Frame Structure 3 applies for E-UTRA inter-band carrier aggregation of o6ne FDD PCell or one TDD PCell and the SCell(s) following the frame structure type 3. The UE shall be capable of handling at least a relative received time difference between the signals received from the PCell and the SCell at the UE receiver of up to □Tr µs as defined in Table 7.9.2-1 when one SCell is configured. When two or three SCells are configured, the UE shall be capable of handling at least a relative propagation delay difference between the signals received from any pair of the serving cells (PCell and the SCells) at the UE receiver of up to □Tr µs as defined in Table 7.9.2-2.

Regarding maximum receive timing difference in dual connectivity. A UE shall be capable of handling a relative receive timing difference between sub-frame timing boundaries of the PCell and PSCell to be aggregated for E-UTRA FDD-FDD, E-UTRA-TDD-TDD, E-UTRA TDD-FDD dual connectivity. Minimum requirements for inter-band Dual Connectivity are that the UE shall be capable of handling at least a relative receive timing difference between the sub-frame timing of the signals received from a cell belonging to the MCG and a cell belonging to the SCG at the UE receiver of up to $\Delta Ts$ µs as defined in FIG. 13 Table 7.15.2-1 provided the UE indicates that it is capable of synchronous dual connectivity. The requirements for synchronous dual connectivity are only applicable for TDD-TDD, FDD-FDD, and TDD-FDD inter-band dual connectivity. The UE shall be capable of handling at least a relative receive timing difference between the sub-frame timing of the signals received from a cell belonging to the MCG and a cell belonging to the SCG at the UE receiver of up of $\Delta Ts$ µs as defined in FIG. 13 Table 7.15.2-2 provided the UE indicates that it is capable of asynchronous dual connectivity. The requirements for asynchronous dual connectivity are only applicable for FDD-FDD inter-band dual connectivity. The UE shall be capable of handling a relative receive timing difference between the sub-frame timing of the signals received from any pair of the serving cells belonging to the same cell group according to the requirements in clause 7.9.2.

In an embodiment, a network node 200 configured for communication in a wireless communication network 300 by using one or more sets of radio resources selected from a total set of radio resources, comprising circuitry comprising a processor 102, and a memory 106, said memory containing instructions executable by said processor, whereby said network node 200 is operative and/or configured to perform any of the methods described herein.

In an embodiment, a computer program comprising computer-executable instructions for causing a network node 200, when the computer-executable instructions are executed on a processing unit comprised in the wireless device, to perform any of the methods described herein.

In an embodiment, a computer program product comprising a computer-readable storage medium, the computer-readable storage medium having the computer program above.

In an embodiment, a carrier containing the computer program above, wherein the carrier is one of an electronic signal, optical signal, radio signal, or computer readable storage medium.

In an embodiment, a wireless device 100 configured for communication in a wireless communication network 300, comprising circuitry comprising a processor 102, and a memory 106, said memory containing instructions executable by said processor, whereby said first wireless device is operative to perform any of the methods described herein.

In an embodiment, a computer program comprising computer-executable instructions for causing a wireless device, when the computer-executable instructions are executed on a processing unit comprised in the wireless device, to perform any of the method steps described herein.

In an embodiment, a computer program product comprising a computer-readable storage medium, the computer-readable storage medium having the computer program described above embodied therein.

In an embodiment, a carrier containing the computer program described above, wherein the carrier is one of an electronic signal, optical signal, radio signal, or computer readable storage medium.

Furthermore, any methods according to embodiments of the invention may be implemented in a computer program, having code means, which when run by processor causes the processor to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the wireless device 100, 200 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor of the present wireless device 100, 200 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting. outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

Embodiments

Embodiment 1. A method (400) for a wireless device (100) for communication in a wireless communication network (300), the method comprising the steps of:
  obtaining (430) a maximum received time difference, MRTD, parameter, and operating (440)
    a first signal (S1) between a wireless device (100) and a first cell (210) of a network node (200) using the MRTD parameter and resource blocks, RB, comprised in a first carrier (F1), and
    a second signal (S2) between the wireless device (100) and a second cell (220) of the network node (200) using the MRTD parameter and RB:s, comprised in a second carrier (F2) different from the first carrier (F1).
Embodiment 2. The method (400) according to embodiment 1, the method (400) further comprising:
  obtaining (410) a first transmission time interval TTI, (TTI1) used for transmission timing of the first signal (S1),
  obtaining (420) a second TTI, (TTI2) used for transmission timing of the second signal (S2), and
  wherein the MRTD parameter is obtained by determining the MRTD parameter based on the first and second TTI (TTI1, TTI2),
Embodiment 3. The method (400) according to any of embodiments 1 or 2, wherein
  operating a first signal (S1) between the wireless device (100) and a first cell (210) of a network node (200) comprises
    receiving the first signal S1 by the wireless device (100) from the first cell 210, or
    transmitting the first signals S1 by the wireless device (100) to the first cell 210, and wherein
  operating a second signal (S2) between the wireless device (100) and the second cell (220) of the network node (200) comprises
    receiving the second signal S2 by the wireless device (100) from the second cell 220 or transmitting the second signal S2 by the wireless device (100) to the second cell 220.
Embodiment 4. The method (400) according to any of the preceding embodiments, wherein the first TTI (TTI1) and/or the second TTI (TTI2) is/are obtained by
  determining the first TTI (TTI1) and/or the second TTI (TTI2) based on predetermined information,
  receiving the first TTI (TTI1) and/or the second TTI (TTI2) comprised in at least one configuration message (CM),
  determining the first TTI (TTI1) and/or the second TTI (TTI2) based on a predetermined rule, or
  performing autonomous determination, such as blind detection.
Embodiment 5. The method (400) according to any of the preceding embodiments, wherein obtaining (430) the MRTD parameter comprises one or more of:
  determining the MRTD parameter based on predetermined information,
  receiving the MRTD parameter comprised in at least one configuration message (CM) and/or received information and/or a received indication,
  the first TTI (TTI1) and/or the second TTI (TTI2)
  determining the MRTD parameter based on a predetermined rule by calculating or evaluating one or more functions based on a/the first and second TTI and/or based on a scaling factor K.
Embodiment 6. The method (400) according to any of the preceding embodiments, wherein operating (440) the first signal (S1) and/or the second signal (S2) further comprises configuring and/or applying multicarrier operation based on the MRTD parameter.
Embodiment 7. The method (400) according to any of the preceding embodiments, the method 400 further comprising using the MRTD parameter for performing one or more operational tasks.
Embodiment 8. The method (400) according to embodiment 7, wherein the operational tasks comprises a selection of any of:
  stopping multicarrier operation,
  deconfiguring, releasing or deactivating the first and/or second cell,
  configuring or activating the first and/or second cell,
  resuming multicarrier operation,
  performing uplink feedback transmission, demodulating of DL channels,
performing CSI measurements on the first and/or second cell, or
reporting results of measurements.

Embodiment 9. The method (400) according to any of the preceding embodiments, the method further comprising:
using identical first TTI and second TTI when operating (440) the first signal (S1) and/or the second signal (S2) in uplink and downlink, and/or
using different first TTI and second TTI when operating (440) the first signal (S1) and/or the second signal (S2) in uplink and downlink.

Embodiment 10. The method (400) according to any of the preceding embodiments, the method further comprising:
using a first TTI when operating (440) the first signal (S1) in uplink and using a an alternative first TTI, different from the first TTI, when operating (440) the first signal (S1) in downlink, and/or
using a second TTI when operating (440) the second signal (S2) in uplink and using an alternative second TTI, different from the second TTI, when operating (440) the second signal (S2) in downlink.

Embodiment 11. A method (500) for a network node (200) for communication in a wireless communication network (300), the method comprising:
obtaining (530) a maximum received time difference, MRTD, parameter operating (540)
a first signal (S1) between a wireless device (100) and a first cell (210) of a network node (200) using the MRTD parameter and resource blocks, RB, comprised in a first carrier (F1), and
a second signal (S2) between the wireless device (100) and a second cell (220) of the network node (200) using the MRTD parameter and RB:s, comprised in a second carrier (F2) different from the first carrier (F1).

Embodiment 12. The method (500) according to embodiment 11, further comprising:
obtaining (510) a first TTI (TTI1) used for transmission timing of the first signal (S1),
obtaining (520) a second TTI (TTI2) used for transmission timing of the second signal (S2),
wherein the MRTD parameter is obtained by determining the MRTD parameter based on the first and second TTI (TTI1, TTI2).

Embodiment 13. The method (500) according to any of the preceding embodiments, further comprising:
configuring the wireless device (100) by sending the MRTD parameter comprised in at least one configuration message (CM).

Embodiment 14. The method (500) of embodiment 11, further comprising:
configuring the wireless device (100) by sending the first. TTI (TTI1) and/or the second TTI (TTI2) comprised in at least one configuration message (CM).

Embodiment 15. The method (500) according to any of the preceding embodiments, wherein operating the first signal S1 between the wireless device 100 and the first cell 210 of the network node 200 comprises
receiving the first signal S1 by the first cell 210 the from wireless device 100 or
transmitting the first signal S1 by the first cell 210 to the wireless device 100, and
wherein operating the second signal S2 between the wireless device 100 and the second cell 220 of the network node 200 comprises receiving the second signal S2 by the second cell 220 from the wireless device 100 or
transmitting the second signals S2 by the second cell 220 to the wireless device 100.

Embodiment 16. The method (500) of embodiment 11, wherein the MRTD parameter is obtained (530) by determining the MRTD parameter based on information indicative of one or more of:
deployment scenario, estimated coverage area of the first and second cell or a capability of the wireless device (100), and
determining (532) a first transmission time interval, TTI, (TTI1) used for transmission timing of the first signal (S1) and determining (534) a second TTI, (TTI2) used for transmission timing of the second signal (S2) based on the determined MRTD parameter.

Embodiment 17. The method (500) according to any of embodiments 12-16, further comprising:
obtaining (510) the first. TTI (TTI1) and the second TTI (TTI2) by determining the first TTI (TTI1) and the second TTI (TTI2) based on:
capability of the wireless device 100,
required bit rate of the wireless device 100,
round trip time, RTT, required to deliver data packet between the wireless device 100 and the network node 200, or
relative distance between the wireless device 100 and the network node 200.

Embodiment 18. The method (500) according to any of the preceding embodiments, the method 500 further comprising using the MRTD: parameter for performing one or more operational tasks.

Embodiment 19. The method (500) according to embodiment 18, wherein the operational tasks comprises a selection of:
stopping multicarrier operation,
deconfiguring, releasing or deactivating the first and/or second cell,
configuring or activating the first and/or second cell,
resuming multicarrier operation, or
modifying the first or second TTI.

Embodiment 20. A network node (200) configured for communication in a wireless communication network (300) by using one or more sets of radio resources selected from a total set of radio resources, comprising circuitry comprising:
a processor (102), and
a memory (106), said memory containing instructions executable by said processor, whereby said network node (200) is operative and/or configured to perform the method of any of embodiments 10-19.

Embodiment 21. A computer program comprising computer-executable instructions for causing a network node (200), when the computer-executable instructions are executed on a processing unit comprised in the wireless device, to perform the method of any of embodiments 11-19.

Embodiment 22. A computer program product comprising a computer-readable storage medium, the computer-readable storage medium having the computer program according to embodiment 21 embodied therein.

Embodiment 23. A carrier containing the computer program of embodiment 21, wherein the carrier is one of an electronic signal, optical signal, radio signal, or computer readable storage medium.

Embodiment 24. A wireless device (100) configured for communication in a wireless communication network (300), comprising circuitry comprising:

a processor (102), and a memory (106), said memory containing instructions executable by said processor, whereby said first wireless device is operative to perform the method of any of embodiments 1-10.

Embodiment 25. A computer program comprising computer-executable instructions for causing a network node (200), when the computer-executable instructions are executed on a processing unit comprised in the wireless device, to perform the method of any of embodiments 1-10.

Embodiment 26. A computer program product comprising a computer-readable storage medium, the computer-readable storage medium having the computer program according to claim 25 embodied therein.

Embodiment 27. A carrier containing the computer program of claim 25, wherein the carrier is one of an electronic signal, optical signal, radio signal, or computer readable storage medium.

Embodiment 28. A network node (200) configured for communication in a wireless communication network (300), the network node (200) interacting with a wireless device (100), the network node (200) comprising:

an obtaining module for obtaining (530) a maximum received time difference, MRTD, parameter, and an operating module for operating (540)

a first signal (S1) between a wireless device (100) and a first cell (210) of a network node (200) using the MRTD parameter and resource blocks, RB, comprised in a first carrier (F1), and a second signal (S2) between the wireless device (100) and a second cell (220) of the network node (200) using the MRTD parameter and RB:s, comprised in a second carrier (F2) different from the first carrier (F1).

Embodiment 29. A wireless device (100) configured for communication in a wireless communication network (300), the wireless device (100) interacting with a network node (200), the wireless device (100) comprising:

an obtaining module for obtaining (430) a maximum received time difference, MRTD, parameter, and an operating module for operating (440)

a first signal (S1) between the wireless device (100) and a first cell (210) of a network node (200) using the MRTD parameter and resource blocks, RB, comprised in a first carrier (F1), and a second signal (S2) between the wireless device (100) and a second cell (220) of the network node (200) using the MRTD parameter and RB:s, comprised in a second carrier (F2) different from the first carrier (F1).

The invention claimed is:

1. A method for a wireless device for communication in a wireless communication network, the method comprising the steps of:

obtaining a first transmission time interval used for transmission timing of a first signal (S1);

obtaining a second transmission time interval used for transmission timing of a second signal (S2);

obtaining a maximum received time difference, MRTD, parameter; and operating:

the first signal (S1) between a wireless device and a first cell using the MRTD parameter and a first carrier (F1), and the second signal (S2) between the wireless device and a second cell using the MRTD parameter and a second carrier (F2), the second carrier (F2) being different from the first carrier (F1), wherein the MRTD parameter is obtained by determining the MRTD parameter based on the first transmission time interval and the second transmission time interval.

2. The method according to claim 1, the method further comprising:

using the same first transmission time interval and second transmission time interval when operating the first signal (S1) and the second signal (S2) in uplink and downlink, or using different first transmission time interval and second transmission time interval when operating the first signal (S1) and/or the second signal (S2) in uplink and downlink.

3. The method according to claim 1, the method further comprising:

using the first transmission time interval when operating the first signal (S1) in uplink and using an alternative first transmission time interval, different from the first transmission time interval, when operating the first signal (S1) in downlink, and using the second transmission time interval, when operating the second signal (S2) in uplink and using an alternative second transmission time interval, different from the second transmission time interval, when operating the second signal (S2) in downlink.

4. The method according to claim 1, wherein obtaining the MRTD parameter comprises one or more of:

determining the MRTD parameter based on predetermined information, receiving the MRTD parameter comprised in at least one configuration message (CM) and/or received information and/or a received indication, determining the MRTD parameter based on a predetermined rule by calculating or evaluating one or more functions based on the first transmission time interval and the second transmission time interval and/or based on at least one scaling factor K.

5. The method according to claim 4, wherein at least one of the one or more functions is defined by the relation:

MRTD parameter=f (the first transmission time interval, the second transmission time interval, K).

6. The method according to claim 4, wherein operating a first signal (S1) comprises receiving the first signal S1 by the wireless device from the first cell 210 using an alternative first transmission time interval, or transmitting the first signal S1 using the alternative first transmission time interval, and wherein operating a second signal (S2) comprises receiving the second signal S2 by the wireless device from the second cell 220 using the second transmission time interval or transmitting the second signal S2 by the wireless device to the second cell 220 using an alternative second transmission time interval, wherein at least one of the one or more functions is defined by:

MRTD parameter=f2 (the alternative first transmission time interval, the first transmission time interval, the alternative second transmission time interval, the second transmission time interval, K), MRTD parameter=f3 (the alternative first transmission time interval, the alternative second transmission time interval, the first transmission time interval, or MRTD parameter=f4 (the alternative first transmission time interval, the alternative second transmission time interval, the second transmission time interval.

7. The method according to claim 5, wherein the at least one scaling factor K may be obtained as a pre-defined value, obtained in a configuration message from a network node or obtained by evaluating one or more functions based on the first transmission time interval and the second transmission time interval, wherein at least one of the one or more functions is defined by the relation K=f1 (the first transmission time interval, the second transmission time interval).

8. The method according to claim 4, wherein if the alternative first transmission time interval is different from the alternative second transmission time interval or the first transmission time interval is different from the second transmission time interval, the MRTD parameter is determined by aggregating the result of the one or more functions evaluated for each transmission time interval using a combining function such as minimum, maximum, average or percentile.

9. The method according to claim 1, wherein obtaining the MRTD parameter is performed by:
determining if the wireless device operates in a synchronous or in an asynchronous mode of operation, and
setting the MRTD parameter to a value relatively smaller in magnitude when operating in the synchronous mode of operation than when operating in the asynchronous mode of operation, or
setting the MRTD parameter to a value relatively larger in magnitude when operating in the synchronous mode of operation than when operating in the asynchronous mode of operation.

10. The method according to claim 1, the method further comprising configuring and/or applying multicarrier operation based on the MRTD parameter.

11. The method according to claim 1, the method further comprising using the MRTD parameter for performing one or more operational tasks.

12. The method according to claim 11 wherein the operational tasks comprises a selection of any of:
starting/stopping multicarrier operation,
deconfiguring, releasing or deactivating the first and/or second cell,
configuring or activating the first and/or second cell,
resuming multicarrier operation,
performing uplink feedback transmission,
demodulating of DL channels,
performing CSI measurements on the first and/or second cell, or
reporting results of measurements.

13. A method for a network node for communication in a wireless communication network, the method comprising:
obtaining a first transmission time interval used for transmission timing of a first signal (S1);
obtaining a second transmission time interval used for transmission timing of a second signal (S2);
obtaining a maximum received time difference, MRTD, parameter; and
operating:
the first signal (S1) between a wireless device and a first cell using the MRTD parameter and a first carrier (F1), and
the second signal (S2) between the wireless device and a second cell using the MRTD parameter and a second carrier (F2) different from the first carrier (F1), wherein the MRTD parameter is obtained by determining the MRTD parameter based on the first transmission time interval and the second transmission time interval.

14. The method according to claim 13, the method further comprising:
using the same first transmission time interval and second transmission time interval when operating the first signal (S1) and the second signal (S2) in uplink and downlink, or
using different first transmission time interval and second transmission time interval when operating the first signal (S1) and/or the second signal (S2) in uplink and downlink.

15. The method according to claim 13, the method further comprising:
using the first transmission time interval when operating the first signal (S1) in uplink and using an alternative first transmission time interval, different from the first transmission time interval, when operating the first signal (S1) in downlink, and
using the second transmission time interval, when operating the second signal (S2) in uplink and using an alternative second transmission time interval, different from the second transmission time interval, when operating the second signal (S2) in downlink.

16. The method according to claim 13, further comprising:
configuring the wireless device by sending the MRTD parameter comprised in at least one configuration message (CM).

17. The method according to claim 13, further comprising:
configuring the wireless device by sending information indicative of the first transmission time interval and/or the second transmission time interval comprised in at least one configuration message (CM).

18. The method of claim 13, wherein the MRTD parameter is obtained by determining the MRTD parameter based on information indicative of one or more of:
deployment scenario, estimated coverage area of the first and second cell or a capability of the wireless device, and
the first transmission time interval used for transmission timing of the first signal (S1) and the second transmission time interval used for transmission timing of the second signal (S2) based on the determined MRTD parameter.

19. The method according to claim 13, further comprising:
obtaining the first transmission time interval and the second transmission time interval by determining the first transmission time interval and the second transmission time interval based on any combination of:
capability of the wireless device,
required bit rate of the wireless device,
round trip time, RTT, required to deliver data packet between the wireless device and the network node, or
relative distance between the wireless device and the network node.

20. The method according to claim 13, the method further comprising using the MRTD parameter for performing one or more operational tasks.

21. The method according to claim 20, wherein the operational tasks comprises a selection of:
starting/stopping multicarrier operation,
deconfiguring, releasing or deactivating the first and/or second cell, configuring or activating the first and/or second cell,
resuming multicarrier operation, or
modifying the first transmission time interval or the second transmission time interval.

22. A wireless device configured for communication in a wireless communication network, comprising circuitry comprising:
a processor, and
a memory, said memory containing instructions executable by said processor, whereby said first wireless device is operative to:
obtain a first transmission time interval used for transmission timing of a first signal (S1),
obtain a second transmission time interval used for transmission timing of a second signal (S2),
obtain a maximum received time difference, MRTD, parameter, and
operate:
the first signal (S1) between a wireless device and a first cell using the MRTD parameter and a first carrier (F1), and
the second signal (S2) between the wireless device and a second cell using the MRTD parameter and a second carrier (F2), the second carrier (F2) being different from the first carrier (F1), wherein the MRTD parameter is obtained by determining the MRTD parameter based on the first transmission time interval and the second transmission time interval.

23. A computer program product comprising a computer-readable storage medium, the computer-readable storage medium having a computer program, the computer program comprising computer-executable instructions for causing a wireless device, when the computer-executable instructions are executed on a processing unit comprised in the wireless device, to:
obtain a first transmission time interval used for transmission timing of a first signal (S1),
obtain a second transmission time interval used for transmission timing of a second signal (S2),
obtain a maximum received time difference, MRTD, parameter, and
operate:
the first signal (S1) between a wireless device and a first cell using the MRTD parameter and a first carrier (F1), and
the second signal (S2) between the wireless device and a second cell using the MRTD parameter and a second carrier (F2), the second carrier (F2) being different from the first carrier (F1), wherein the MRTD parameter is obtained by determining the MRTD parameter based on the first transmission time interval and the second transmission time interval.

24. A network node configured for communication in a wireless communication network by using one or more sets of radio resources selected from a total set of radio resources, comprising circuitry comprising:
a processor, and
a memory, said memory containing instructions executable by said processor, whereby said network node is operative and/or configured to:
obtain a first transmission time interval used for transmission timing of a first signal (S1);
obtain a second transmission time interval used for transmission timing of a second signal (S2);
obtain a maximum received time difference, MRTD, parameter; and
operate:
the first signal (S1) between a wireless device and a first cell using the MRTD parameter and a first carrier (F1), and
the second signal (S2) between the wireless device and a second cell using the MRTD parameter and a second carrier (F2) different from the first carrier (F1), wherein the MRTD parameter is obtained by determining the MRTD parameter based on the first transmission time interval and the second transmission time interval.

25. A computer program product comprising a computer-readable storage medium, the computer-readable storage medium having a computer program, the computer program comprising computer-executable instructions for causing a network node, when the computer-executable instructions are executed on a processing unit comprised in the network node, to:
obtain a first transmission time interval used for transmission timing of a first signal (S1);
obtain a second transmission time interval used for transmission timing of a second signal (S2);
obtain a maximum received time difference, MRTD, parameter; and
operate:
the first signal (S1) between a wireless device and a first cell using the MRTD parameter and a first carrier (F1), and
the second signal (S2) between the wireless device and a second cell using the MRTD parameter and a second carrier (F2) different from the first carrier (F1), wherein the MRTD parameter is obtained by determining the MRTD parameter based on the first transmission time interval and the second transmission time interval.

* * * * *